United States Patent
Dobronsky

(10) Patent No.: US 8,959,330 B2
(45) Date of Patent: *Feb. 17, 2015

(54) DYNAMIC IMPROVEMENT OF INTERNET BROWSER APPEARANCE AND CONNECTIVITY

(75) Inventor: Oren Dobronsky, Tel-Aviv (IL)

(73) Assignee: Pinball Acquisition Corporation, Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/615,002

(22) Filed: Sep. 13, 2012

(65) Prior Publication Data

US 2013/0042188 A1 Feb. 14, 2013

Related U.S. Application Data

(63) Continuation of application No. 11/614,430, filed on Dec. 21, 2006, now Pat. No. 8,285,982, which is a continuation of application No. 10/420,625, filed on Apr. 22, 2003, now Pat. No. 7,159,192, which is a (Continued)

(51) Int. Cl.
*G06F 21/00* (2013.01)
*G06Q 10/10* (2012.01)
(Continued)

(52) U.S. Cl.
CPC .......... *G06Q 10/107* (2013.01); *G06F 3/04817* (2013.01); *G06F 3/0482* (2013.01)
USPC .......................................... 713/150; 709/206

(58) Field of Classification Search
CPC ... G06Q 30/02; G06Q 30/06; G06Q 30/0601; G06Q 30/00; G06Q 30/0277; G06Q 30/0613; G06Q 30/0255; G06F 3/0481; G06F 3/0484; G06F 3/0482; G06F 3/04817; H04L 67/22

USPC .......................... 380/232; 713/150; 709/206; 715/751–759, 744, 779, 825
See application file for complete search history.

(56) References Cited

U.S. PATENT DOCUMENTS 5,786,815 A 7/1998 Ford
5,793,693 A 8/1998 Collins et al.
(Continued)

FOREIGN PATENT DOCUMENTS

WO   WO 98/47080 A2   2/1998
WO   WO 00/25239      5/2000
(Continued)

OTHER PUBLICATIONS

U.S. Appl. No. 10/396,647, Dobronsky et al.
(Continued)

*Primary Examiner* — Darren B Schwartz
*Assistant Examiner* — John B King
(74) *Attorney, Agent, or Firm* — Rutan & Tucker, LLP

(57) ABSTRACT

A plug-in is one of 1) installed or 2) caused to be installed in the browser of a web surfer. The plug-in is configured to allow information to be dynamically 1) added to, 2) modified in, and 3) any combination of the two, the area of the browser containing a user-selectable button by the action of the plug-in. The user-selectable button is displayed in the area of the webpage. The button can include graphic information and a text label. The button is configured to 1) direct the browser to at least one web site corresponding to the text label, 2) direct the browser to content related links to the content that is on the website being browsed, and 3) any combination of both. A third party server site may dynamically control what graphic information, text label, or both is being displayed for that user-selectable button.

21 Claims, 24 Drawing Sheets

Related U.S. Application Data continuation of application No. 10/396,647, filed on Mar. 24, 2003, now abandoned, which is a continuation-in-part of application No. 09/864,551, filed on May 23, 2001, now Pat. No. 7,222,303, which is a continuation-in-part of application No. 09/373,815, filed on Aug. 13, 1999, now Pat. No. 6,784,900.

(51) Int. Cl.
   *G06F 3/0481* (2013.01)
   *G06F 3/0482* (2013.01)

(56) References Cited

U.S. PATENT DOCUMENTS

| | | | |
|---|---|---|---|
| 5,796,393 | A | 8/1998 | MacNaughton et al. |
| 5,818,446 | A | 10/1998 | Bertram et al. |
| 5,818,447 | A | 10/1998 | Wolfe et al. |
| 5,850,548 | A | 12/1998 | Williams |
| 5,875,296 | A | 2/1999 | Shi et al. |
| 5,880,731 | A | 3/1999 | Liles et al. |
| 5,901,313 | A | 5/1999 | Wolf et al. |
| 5,923,885 | A | 7/1999 | Johnson et al. |
| 5,932,885 | A | 8/1999 | DeBellis et al. |
| 5,964,836 | A | 10/1999 | Rowe et al. |
| 5,986,654 | A | 11/1999 | Alexander et al. |
| 5,999,179 | A | 12/1999 | Kekic et al. |
| 5,999,973 | A | 12/1999 | Glitho et al. |
| 6,028,997 | A | 2/2000 | Leymann et al. |
| 6,034,681 | A | 3/2000 | Miller et al. |
| 6,041,360 | A | 3/2000 | Himmel et al. |
| 6,054,987 | A | 4/2000 | Richardson |
| 6,059,842 | A | 5/2000 | Dumarot et al. |
| 6,064,383 | A | 5/2000 | Skelly |
| 6,091,411 | A | 7/2000 | Straub et al. |
| 6,104,397 | A | 8/2000 | Ryan et al. |
| 6,121,967 | A | 9/2000 | Foster et al. |
| 6,133,915 | A | 10/2000 | Arcuri et al. |
| 6,141,010 | A | 10/2000 | Hoyle |
| 6,148,346 | A | 11/2000 | Hanson |
| 6,175,363 | B1 | 1/2001 | Williams et al. |
| 6,188,403 | B1 | 2/2001 | Sacerdoti et al. |
| 6,195,681 | B1 | 2/2001 | Appleman et al. |
| 6,195,691 | B1 | 2/2001 | Brown |
| 6,208,336 | B1 | 3/2001 | Carter |
| 6,232,972 | B1 | 5/2001 | Arcuri et al. |
| 6,266,058 | B1 | 7/2001 | Meyer |
| 6,288,753 | B1 | 9/2001 | DeNicola et al. |
| 6,292,185 | B1 | 9/2001 | Ko et al. |
| 6,295,058 | B1 | 9/2001 | Hsu et al. |
| 6,297,819 | B1 * | 10/2001 | Furst ........................ 715/733 |
| 6,304,898 | B1 | 10/2001 | Shiigi |
| 6,405,225 | B1 | 6/2002 | Apfel et al. |
| 6,496,203 | B1 | 12/2002 | Beaumont et al. |
| 6,522,333 | B1 | 2/2003 | Hatlelid et al. |
| 6,571,290 | B2 | 5/2003 | Selgas et al. |
| 6,651,087 | B1 | 11/2003 | Dennis |
| 6,747,970 | B1 | 6/2004 | Lamb et al. |
| 6,771,290 | B1 | 8/2004 | Hoyle |
| 6,784,900 | B1 | 8/2004 | Dobronsky et al. |
| 6,819,343 | B1 | 11/2004 | Sobeski et al. |
| 6,931,254 | B1 | 8/2005 | Egner et al. |
| 7,107,548 | B2 | 9/2006 | Shafran |
| 7,159,192 | B2 | 1/2007 | Dobronsky et al. |
| 7,222,303 | B2 | 5/2007 | Oren et al. |
| 7,712,033 | B2 * | 5/2010 | Shafron .................... 715/744 |
| 8,285,982 | B2 | 10/2012 | Dobronsky et al. |
| 8,661,349 | B2 | 2/2014 | Dobronsky et al. |
| 2001/0029527 | A1 | 10/2001 | Goshen |
| 2002/0140732 | A1 | 10/2002 | Tveskov |
| 2002/0149611 | A1 | 10/2002 | May |
| 2003/0107593 | A1 | 6/2003 | Domenico |
| 2003/0110450 | A1 | 6/2003 | Sakai |
| 2003/0206200 | A1 | 11/2003 | Hejl |
| 2003/0208543 | A1 | 11/2003 | Enete et al. |
| 2003/0225846 | A1 | 12/2003 | Heikes et al. |
| 2004/0003097 | A1 | 1/2004 | Willis et al. |
| 2004/0041836 | A1 | 3/2004 | Zaner et al. |
| 2004/0215721 | A1 | 10/2004 | Szeto et al. |
| 2004/0221224 | A1 | 11/2004 | Blattner et al. |
| 2004/0268263 | A1 | 12/2004 | Van Dok et al. |
| 2007/0162867 | A1 | 7/2007 | Dobronsky et al. |
| 2007/0245246 | A1 | 10/2007 | Oren et al. |

FOREIGN PATENT DOCUMENTS

| | | | |
|---|---|---|---|
| WO | WO 0025239 | * | 5/2000 |
| WO | WO-0025239 | | 5/2000 |
| WO | WO 01/06409 A1 | | 1/2001 |
| WO | WO 01/97121 | | 12/2001 |
| WO | WO 02/08852 | | 1/2002 |
| WO | WO 02/32032 A2 | | 4/2002 |
| WO | WO-2004095413 | | 11/2004 |

OTHER PUBLICATIONS

U.S. Appl. No. 10/718,396, filed Sep. 30, 2004, Dobronsky et al.
U.S. Appl. No. 11/737,824, filed Oct. 18, 2007, Dobronsky et al.
Non-Final Rejection Action for U.S. Patent & Trademark Office, U.S. Appl. No. 13/615,002 mailed May 15, 2013, 21 pages. U.S. Patent & Trademark Office, Alexandria, Virginia USA.
Notice of Allowance for U.S. Appl. No. 11/614,430 mailed Jun. 1, 2012, 7 pages. (issued as U.S. 8,285,982). U.S. Patent & Trademark Office, Alexandria, Virginia USA.
Notice of Allowance for U.S. Appl. No. 11/614,430 mailed Mar. 30, 2012, 8 pages.(issued as U.S. 8,285,982). U.S. Patent & Trademark Office, Alexandria, Virginia USA.
Non-Final Rejection Action for U.S. Appl. No. 11/614,430 mailed Aug. 25, 2010, 13 pages. (issued as U.S. 8,285,982). U.S. Patent & Trademark Office, Alexandria, Virginia USA.
Non-Final Rejection Action for U.S. Appl. No. 11/614,430 mailed Jan. 25, 2010, 23 pages.(issued as U.S. 8,285,982). U.S. Patent & Trademark Office, Alexandria, Virginia USA.
Final Rejection Action for U.S. Appl. No. 11/614,430 mailed Mar. 15, 2011, 14 pages.(issued as U.S. 8,285,982). U.S. Patent & Trademark Office, Alexandria, Virginia USA.
Notice of Allowance for U.S. Appl. No. 10/420,625 mailed Aug. 24, 2006, 3 pages. (issued as U.S. 7,159,192). U.S. Patent & Trademark Office, Alexandria, Virginia USA.
Notice of Allowance for U.S. Appl. No. 10/420,625 mailed Aug. 24, 2006, 3 pages. ( issued as U.S. 7,159,192). U.S. Patent & Trademark Office, Alexandria, Virginia USA.
Non-Final Rejection Action for U.S. Appl. No. 10/420,625 mailed Sep. 21, 2005, 10 pages. (issued as U.S. 7,159,192). U.S. Patent & Trademark Office, Alexandria, Virginia USA.
Final Rejection Action for U.S. Appl. No. 10/420,625 mailed May 4, 2005, 9 pages. ( issued as U.S. 7,159,192). U.S. Patent & Trademark Office, Alexandria, Virginia USA.
Non-Final Rejection Action for U.S. Appl. No. 10/420,625 mailed Oct. 21, 2004, 8 pages. ( issued as U.S. 7,159,192). U.S. Patent & Trademark Office, Alexandria, Virginia USA.
Notice of Allowance for U.S. Appl. No. 09/864,551 mailed Jan. 24, 2007, 3 pages. (issued as U.S. 7,222,303). U.S. Patent & Trademark Office, Alexandria, Virginia USA.
Notice of Allowance for U.S. Appl. No. 09/864,551 mailed Jan. 24, 2007, 4 pages. (issued as U.S. 7,222,303).U.S. Patent & Trademark Office, Alexandria, Virginia USA.
Final Rejection Action for U.S. Appl. No. 09/864,551 mailed Jul. 26, 2006, 8 pages.(issued as U.S. 7,222,303).U.S. Patent & Trademark Office, Alexandria, Virginia USA.
Non-Final Rejection Action for U.S. Appl. No. 09/864,551 mailed Dec. 27, 2005, 8 pages.(issued as U.S. 7,222,303).U.S. Patent & Trademark Office, Alexandria, Virginia USA.
Non-Final Rejection Action for U.S. Appl. No. 09/864,551 mailed Jun. 28, 2005, 8 pages.(issued as U.S. 7,222,303). U.S. Patent & Trademark Office, Alexandria, Virginia USA.
Final Rejection Action for U.S. Appl. No. 09/864,551 mailed Sep. 10, 2004, 8 pages.(issued as U.S. 7,222,303). U.S. Patent & Trademark Office, Alexandria, Virginia USA.

(56) References Cited

OTHER PUBLICATIONS

Non-Final Rejection Action for U.S. Appl. No. 09/864,551 mailed Mar. 1, 2004, 6 pages.(issued as U.S. 7,222,303). U.S. Patent & Trademark Office, Alexandria, Virginia USA.
Stardock Press Release (Stardock Announces WindowBlinds, version 0.80, Mar. 24, 1999), 2 pages.
WindowBlinds 0.95 Preview, ActiveWindows. 2 pages, wysiwyg://154/http :/ /www .activewin .com/reviews/wb/95pre/wb95.shtm l, [last accessed Feb. 8, 2002].
Leebow's Friday Letter ( http://scout118.cs.wisc.edu/netnews/Jun. 4, 1999/001 O.html), 3 pages.
Yahoo! Companion [http ://www.32bit .com/software/listings/ Internet/Plugin/ S/1 0416]; Printed May 14, 2001, 2 pages.
Winamp Skins, Sep. 26, 1998, 9 pages.
Keller, Richard M., et al., "A Bookmarking Service for Organizing and Sharing URLs", Elsevier Science B.V, May 14, 1998, 12 pp.
NeoPlanet Home Page,© 1998-2004 NeoPlanet, Inc., 1 page, http://www.neoplanet.com. [last accessed Dec. 27, 2006].
Alexa Homepage and Associated Webpages. http://www.archive.org. Available Dec. 2000 or earlier. Printed Dec. 2006. 23 pages.
Adam Wisniewski, What, me worry? Despite hard financial times, Web innovations could still be found at Internet World 2000; TimeOut Technology, Nov. 9-16, 2000 Issue No. 268; 1-2 paQes.
Chris Gonsalves, Hardware news, software updates & services briefs, ZDNet eWEEK Building the E-Business Enterprise, Nov. 13, 2000, 1 thru 4 pages.
CHtmlView, MSDN Oct. 2000, 2 pages.
CSkin, MFC Visual C++ 6.0, Published prior to applicant's file date, 7 pages.
"NeoPlanet steps up support of mozilla.org open source software development", Apr. 18, 1999, 00 :NeoPlanet press, 2 pages.
Chappel D; Linthicum D S: "ActiveX demystified", BYTE (International Edition), Sep. 1997, ISSN 0360-5280, vol. 22, No. 9, pp. 56-62, 64, (XP000726365).
TipWorld: "Tips Internet Explorer: Nov. 1996", p. 1-6, published on Internet, available via site htto://www.ccl.iura.uni-sb.de.
TipWorld: "Tips Internet Explorer: Apr. 1998", p. 1-9, published on Internet, available via site l•lttp://vvww .cc1 .iura.uni-sb.de.
Tim Daniels: "1 001 Secrets for Windows NT Registry", Dec. 1997, USA, Internet version, available via Internet at http://www.windowsitlibrary.com. pp. 1-4.
Miah T; Karageorgou M.; Knott R P: "Adaptive Toolbars: An Architectural Overview", 3'd ERCIM Workshop on "User Interfaces for All", Obernai, France, Nov. 3-4, 1997, (XP002165773), 7 pages.
European Office Action, European Patent Office, Application No. 0944199.9, mail date Jul. 29, 2002, 3 pages.
European Office Action, European Patent Office, Application No. 0944199.9, mail date Apr. 25, 2003, 2 pages.
European Office Action, European Patent Office, Application No. 0944199.9, mail date Feb. 7, 2005, 8 pages.
European Office Action, European Patent Office, Application No. 0944199.9, mail date Feb. 8, 2006, 9 pages.
International Search Report, International Patent Application No. PCT/US03/37063, dated Mar. 25, 2004, 1 page. International Searching Authority/US Alexandria, Virginia, USA. (22313-1450).
International Preliminary Examination Report, International Patent Application No. PCT/IL00/00416, dated Sep. 26, 2001, 7 pages. European Patent Office, Munich, Germany. (D-80298).
International Written Opinion, International Patent Application No. PCT/IL00/00416, dated Jul. 11, 2001, 7 pages. European Patent Office, Munich, Germany. (D-80298).
International Search Report, International Patent Application No. PCT/IL00/00416, dated Nov. 15, 2000, 4 pages. European Patent Office, P.B. 5818 Patentlaan 2 NL-2280 HV Rijswijk, Netherlands.
@Mail Webmail System ChangeLog (http://support.atmail.com/v3changelog.html; pp. 1-16;Oct. 2002).
CNET Download.com (http://www.download.com; Plugins; pp. 1-4).
Gluts, Nancy W., "The Rebar Control: Using a Coolbar in Your Application," Microsoft Corporation, (Oct. 1, 1996), 10 pp.
Esposito, Dino, "Browser Helper Objects: The Browser the Way You Want It," Microsoft Corporation, (Jan. 1, 1999), 10 pp.
Gulesian, Marcia, "Plugging Into the Web," DBMS, (Dec. 1, 1996), 6 pp.
Roberts, Scott, "Take Total Control of Internet Explorer with Advanced Hosting Interfaces," MSDN, (Oct. 1, 1998), 8 pp.
Smith, Douglas, WindowBlinds Preview 0.40; Change Desktops as Easily as You Change Clothes, WinPlanet, (Feb. 8, 2002), 2 pp.
Smith, Douglas, WindowBlinds Preview 0.40; What Are These WindowBlind Things Anyway?, WinPlanet, (Feb. 8, 2002), 2 pp.
Keizer, Gregg, "Put a Little Yahoo in Your Browser—Plug-in puts Yahoo content on your browsers toolbar," Feb. 8, 2001, PCWorld. com, Web Services, 1 page, http://www. pcworld. com/resource/printable/article/0, aid, 15179,00. asp, [last accessed Sep. 9, 2004].
Internet Screen Dump, webpages for Yahoo!Companion, Accessed Jul. 23, 2001, http://docs.companion.yahoo.com/companion/learnmore_s_companion.html, 7 pages.
Internet Article (Let Yahoo! Companion Be Your Guide; Users Can Now Customize Browser Toolbar to Feature Yahoo! Bookmarks and Services; Business Wire, Jun. 29, 1999; pp. 2).
Notice of Allowance for U.S. Appl. No. 11/736,824 mailed Oct. 21, 2013, 9 pages. U.S. Patent & Trademark Office, Alexandria, Virginia USA.
Notice of Allowance for U.S. Appl. No. 11/736,824 mailed Apr. 23, 2012, 7 pages. U.S. Patent & Trademark Office, Alexandria, Virginia USA.
Non-Final Office Action for U.S. Appl. No. 11/736,824 mailed Sep. 8, 2011, 9 pages. U.S. Patent & Trademark Office, Alexandria, Virginia USA.

\* cited by examiner

DYNAMIC IMPROVEMENT OF INTERNET BROWSER APPEARANCE AND CONNECTIVITY

RELATED APPLICATIONS

This application claims benefit under 35 USC 120 as a continuation of co-pending U.S. patent application Ser. No. 11/614,430 entitled, "SYSTEM AND METHOD FOR CUSTOMIZING ELECTRONIC MESSAGES," filed in the name of Oren Dobronsky on Dec. 21, 2006, which is a continuation of U.S. patent application Ser. No. 10/420,625, entitled, "SYSTEM AND METHOD FOR CUSTOMIZING ELECTRONIC MESSAGES," filed in the name of Oren Dobronsky on Apr. 22, 2003 and now issued as U.S. Pat. No. 7,159,192, which is a continuation of U.S. patent application Ser. No. 10/396,647, entitled, "SYSTEM AND METHOD FOR CUSTOMIZING ELECTRONIC MESSAGES," filed in the name of Oren Dobronsky on Mar. 24, 2003 (abandoned), which is a continuation-in-part of U.S. patent application Ser. No. 09/864,551 entitled, "SYSTEM AND METHOD FOR THE DYNAMIC IMPROVEMENT OF INTERNET BROWSER NAVIGABILITY," filed in the name of Dobronsky et al. on May 23, 2001 and now issued as U.S. Pat. No. 7,222,303, which is a continuation in part of co-pending U.S. patent application Ser. No. 09/373,815 entitled, "SYSTEM AND METHOD FOR THE DYNAMIC IMPROVEMENT OF INTERNET BROWSER APPEARANCE AND CONNECTIVITY," filed in the name of Dobronsky et al. on Aug. 13, 1999 and now issued as U.S. Pat. No. 6,784,900, which claims priority to Israeli patent application number 130972 filed Jul. 15, 1999, each of which incorporated the earlier applications in by reference and now each of which are hereby currently incorporated by reference.

FIELD OF THE INVENTION

Embodiments of the design generally relate to a method for dynamically improving the appearance and performance of Internet browsers, and their connectivity to web sites.

BACKGROUND OF THE INVENTION

In one of the parent applications mentioned above, there is disclosed a design claiming a method and system by which the Internet Browser, and its standard "toolbar" in particular, is modified in appearance and function through the addition to the standard browser toolbar a custom HotbarToolbar, which may comprise custom "skins" and/or certain custom HotbarToolbar Buttons (hereinafter sometimes referred to as "hotbuttons"); each hotbutton had a name or label, and the depression (clicking) of which caused a pop-up menu of selected website links to appear. In the previous application (the entire contents of which are hereby incorporated by reference), i.e., prior to the method and system according to the current design, these hotbuttons, once "attached" to the HotbarToolbar, remained there, fixed and static in nature, with their identifying name or label remaining whatever it was chosen to be upon the creation and attachment of the button. Notably, the hotbuttons were essentially "static," in that they did not change when the browser navigated from one website to another.

SUMMARY OF THE INVENTION

In an embodiment, a computer-implemented method in a client-server environment is discussed for presenting graphic and other information in a toolbar area of a browser of a client device. At least one user-selectable button in the toolbar area of the browser is displayed. The user-selectable button includes graphic information, a text label, or both. User input selecting the user-selectable button is received. The browser is directed to at least one web site related to the graphic information or the text label of the user-selectable button. The graphic information or the text label is changed dynamically based on information associated with 1) the user, 2) when the browser navigates from one website to another website, and 3) any combination of the two.

In an embodiment, methods and apparatuses in a client-computing device and server environment may provide graphic and other information on an area of the webpage accessible by a browser application resident on a client device. A mechanism provides a plug-in application for installation in the browser application. The plug-in application is one of 1) installed or 2) caused to be installed in the browser of a web surfer. The plug-in application is configured to allow information to be dynamically 1) added to, 2) modified in, and 3) any combination of the two, the area of the browser containing a user-selectable button by the action of the plug-in. The user-selectable button is displayed in the area of the webpage. The user-selectable button includes at least one of graphic information and a text label. The user-selectable button is configured to any of 1) direct the web browser to at least one web site corresponding to the text label, 2) direct the web browser to content related links to a content that is on the website being browsed, and 3) any combination of both. A third party server site may dynamically control what graphic information, text label, or both is being displayed for that user-selectable button.

In an embodiment, a service website is configured to cooperate with a client device having a resident browser. The service website is configured to dynamically update an attribute of the browser, via a computer implemented method. The computer implemented method when performed by a client device, then the operations of the method may include the following. Graphic information, a text label, or both may be provided in a browser. The service website is connected to the Internet. The graphic information or text label may be modified based on information associated with 1) a user of the browser, 2) when the browser navigates from one website to another website, and any combination of the two. A user-selectable button may be displayed in association with the graphic information or text label. The user-selectable button is configured for directing the browser to at least one web site related to the graphic information or text label. The user-selectable button is provided via a component installed or plugged in to cooperate with the browser. What graphic information, text label, or both, is controlled and displayed with that user-selectable button from the service website.

BRIEF DESCRIPTION OF THE DRAWINGS

The drawings refer to embodiments of the invention in which:

FIG. 17 is an illustration of a prior art main window of an exemplary electronic message program, which may be displayed on the user terminal of FIG. 14 prior to installation of the plug-in.

FIG. 18 is an illustration of a prior art electronic message window of an exemplary electronic message program, which may be displayed on the user terminal of FIG. 1 prior to installation of the plug-in.

While embodiments of the design have been described by way of illustration, it will be understood that the design can be carried out by persons of ordinary skill in the art with many modifications, variations and adaptations, without departing from the scope of the claims and the legally permissible equivalents thereof.

DETAILED DISCUSSION

In accordance with the method and system of an embodiment of the design, there are provided means for dynamically selecting one or more customized hotbuttons for incorporation into the HotbarToolbar, the selection of such will change during the use of the browser (as when one navigates from one site to another) and the choice of which may be made according to one or more of a variety of factors. Said means may, for example, be provided in the form of the client computer sending information which information may include, for example, its current location URL to the server, and receiving therefrom a list of the appropriate hotbuttons to be displayed on the HotbarToolbar. The appearance and/or the contents (e.g., links) of a hotbutton might change as a function of one or more factors, such as, for example: the subject of the current web page that the browser is viewing, the skin that is wrapped around the toolbar, the context and/or content of the current web page (including, but not limited to, products displayed on the current web page), desired advertisement, demographic information, geographic information, the behavior of the user, the interests of the user, as well as for other reasons which will be readily apparent to those of ordinary skill in the relevant art.

The HotbarToolbar comprises a plurality of categorized or related links, which in the presently preferred embodiment are organized under customized, newly and dynamically added toolbar buttons known as hotbuttons. The name and/or content of the hotbuttons may change dynamically in accordance with various factors (including, but not limited to, changes in URL).

Figure 1:
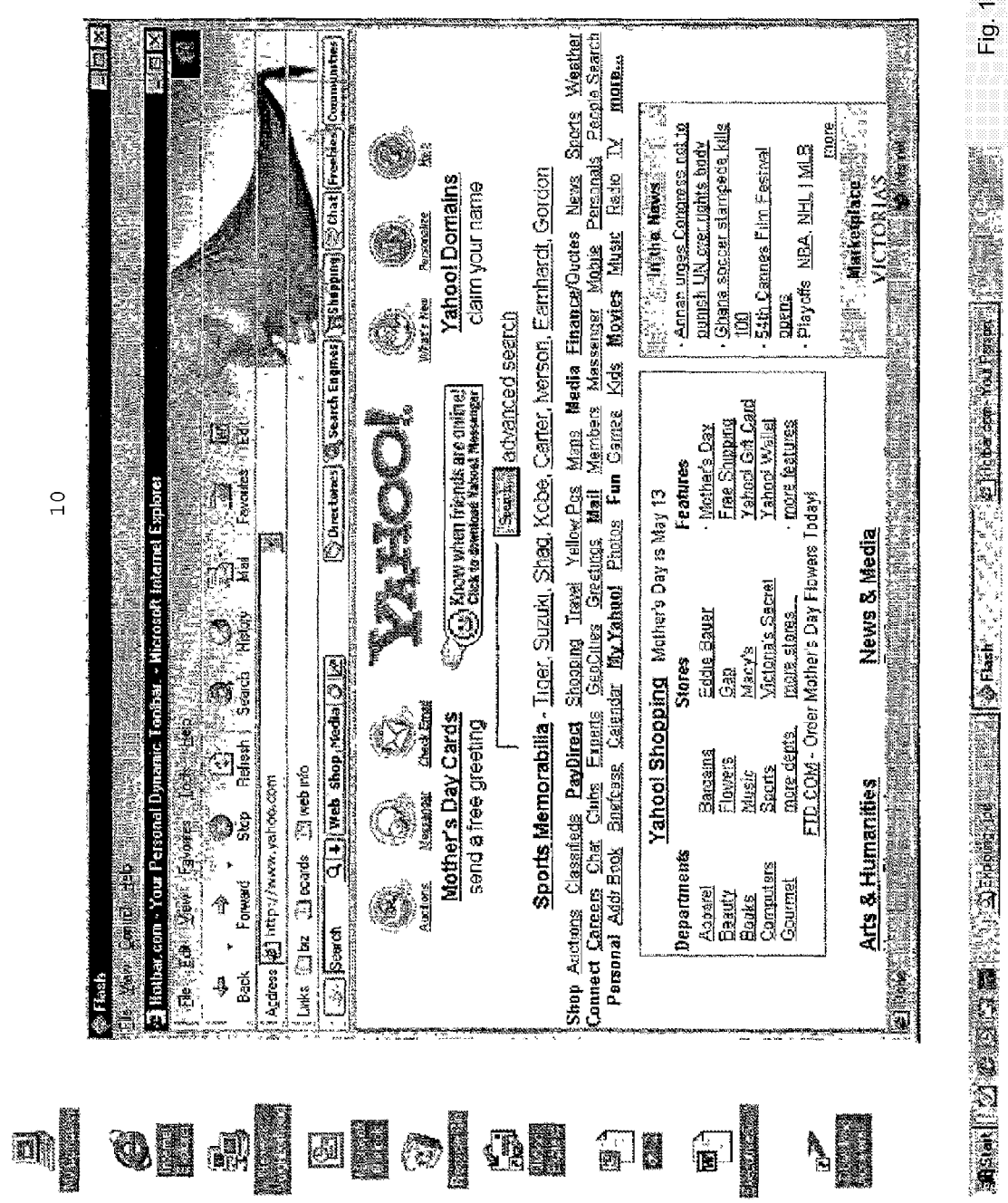
FIG. 1 is a screenshot of a customized browser comprising the method and system according to an embodiment of the design, showing the browser's appearance at www.yahoo.com.

Reference is now made to FIG. 1, which shows a customized browser 10 comprising the method and system according to an embodiment of the design. Note in FIG. 1 that the browser 10 is shown located at the website www.yahoo.com—a site of general interest. Note in FIG. 1 that, in accordance with an embodiment of the design, certain hotbuttons were chosen for incorporation into the HotbarToolbar; these hotbuttons are labeled "Directories," "Search Engines," "Shopping," "Chat," "Freebies" and "Communities". Note further the custom skin; in addition to all its other functions and purposes, its presence is a signal to the surfer that he or she is using a modified (enhanced) browser 01, and hence the custom skin works cooperatively and synergistically with the other elements of the method and system of an embodiment of the design, especially inasmuch as it alerts a user to the presence of the custom hotbuttons.

Figure 2:
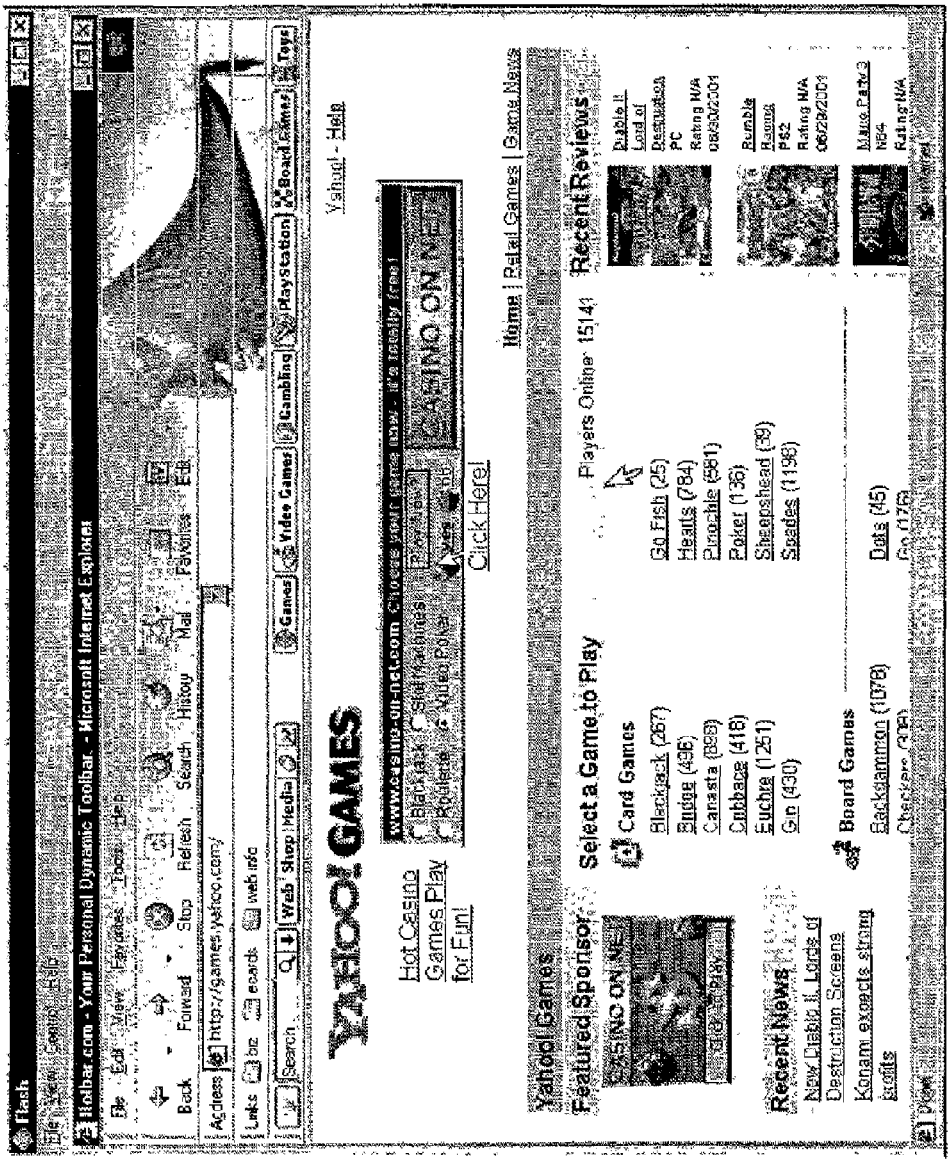
FIG. 2 is a screenshot of a customized browser comprising the method and system according to an embodiment of the design, showing the browser's appearance at http://games.yahoo.com with the new hotbuttons.

It is useful to next consider how the selection of hotbuttons changes when the browser 10 is directed to another site. As is well known to those of ordinary skill in the art, entering a new URL, whether manually, via hyperlink, or otherwise will redirect the browser to that new URL. For example, if one enters http://games.yahoo.com into the address window, he or she will be redirected to that page, as depicted in FIG. 2. In accordance with traditional browser operation, browsing to the new address: http://games.yahoo.com, has resulted in the display of new content, i.e., the content of the web page located at that site—in this instance, content relating to games. Also, in accordance with the method and system of an embodiment of the design, browsing to the new address http://games.yahoo.com has resulted in the incorporation of new hotbuttons related to said address (e.g., URL, content, etc.).

To better understand and appreciate the method and system according to an embodiment of the design, look more closely at FIG. 2 and compare it to FIG. 1. Note that the labels on the hotbuttons have changed from what they were in FIG. 1. Specifically, the hotbuttons labeled "Directories," "Search Engines," "Shopping," "Chat," "Freebies" and "Communities" which had been displayed in the browser 10 located at www.yahoo.com (see FIG. 1), have changed to different hotbuttons, labeled "Games," "Video Games," "Gambling," "Play Station," "Board Games" and "Toys" which are displayed in the browser 12 located at http://games.yahoo.com (see FIG. 2).

Thus, it is readily seen that, in accordance with the method and system according to an embodiment of the design, the customized hotbuttons are not static, but dynamic, and change during the operation of the browser according to factors previously discussed. Clicking on a hotbutton may result in various actions; in this example, it yields a list of links related to that hotbutton label (topic). In the instance where one or more hotbuttons are related to a specific product(s) displayed within the web page, the list of links yielded when clicking the hotbutton may also include comparative shopping information related to such product(s).

Note that the hotbuttons displayed on the HotbarToolbar are actually related to the topics, content (including, but not limited to, products) and/or appearance of what is displayed on the screen. This is an important aspect of an embodiment of the design. It should be understood that any one or more of a variety of techniques could be used to dynamically select the hotbuttons displayed on the HotbarToolbar at any time. For example, the customized browser 12 constituted and operated in accordance with an embodiment of the design might associate the URL to a pre-cataloged directory which defined related hotbutton topics; alternatively, or additionally, an embodiment of the design may analyze the content of the page displayed, and, upon finding certain keywords, identify hotbuttons relevant to those keywords; alternatively, or additionally, the customized browser 12 might analyze the IP address underlying the URL to which the customized browser has been directed, and infer therefrom certain demographic information and/or geographic information and/or other information which it might use in assigning the relevant topics to the hotbuttons.

Figure 3:
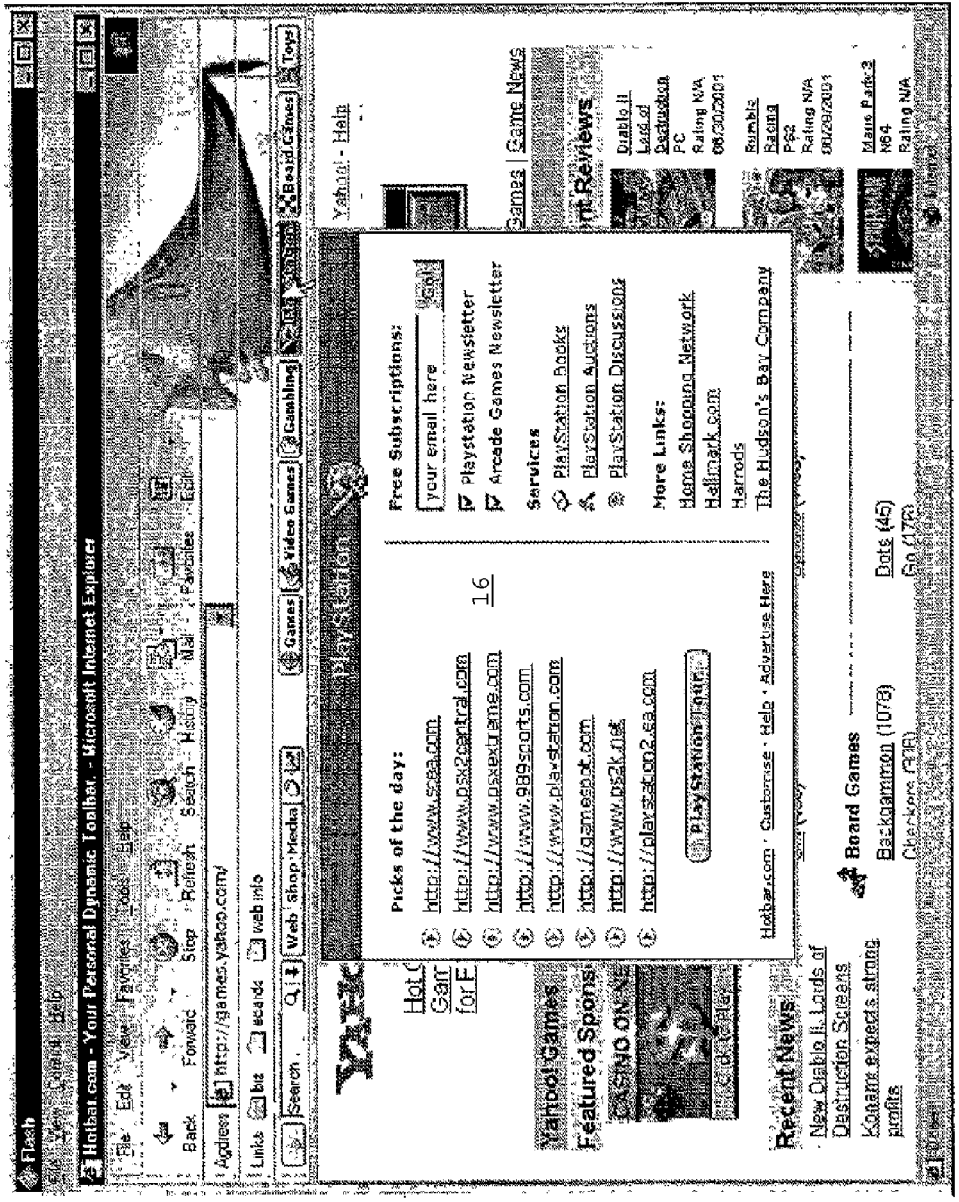
FIG. 3 is a screenshot of a customized browser comprising the method and system according to an embodiment of the design, showing the browser's appearance at http://games.yahoo.com after the user has clicked on the Playstation hotbutton as illustrated therein.

Consider next what happens when a surfer clicks on a hotbutton in this example, e.g., the hotbutton in FIG. 3 that is labeled "PlayStation". FIG. 3 shows the result of such a click—the emergence of a pop-up window 16 (hereinafter sometimes referred to as a "Center") comprising links relating to the title, or topic of that hotbutton.

FIG. 1 is a screenshot of a customized browser 10 comprising the method and system according to an embodiment of the design, showing the browser's appearance at www.yahoo.com.

FIG. 2 is a screenshot of a customized browser 12 comprising the method and system according to an embodiment of the design, showing the browser's appearance at http://games.yahoo.com with the new hotbuttons.

FIG. 3 is a screenshot of a customized browser comprising the method and system according to an embodiment of the design, showing the browser's appearance at http://games.yahoo.com after the user has clicked on the Playstation hotbutton as illustrated therein.

Figure 4:
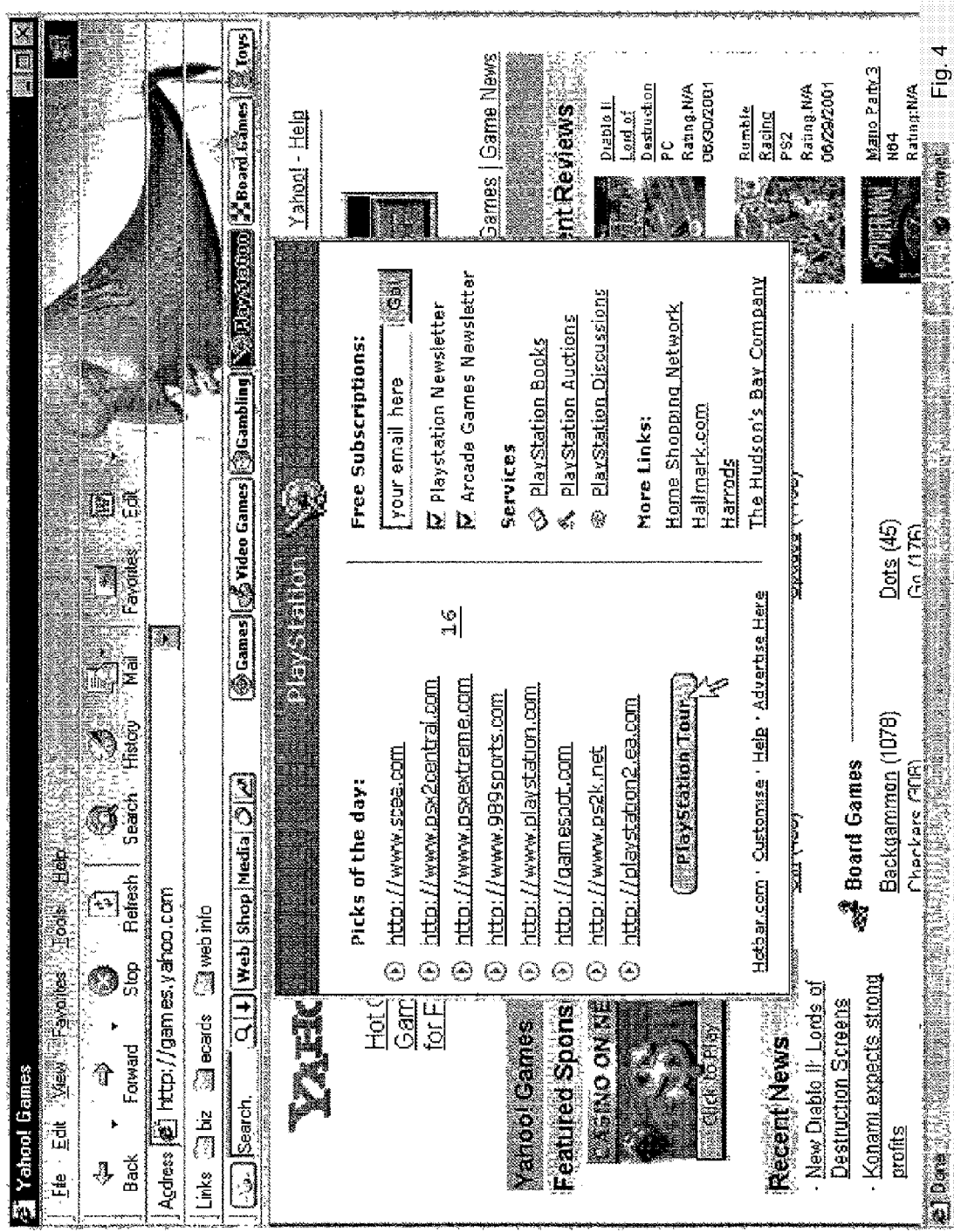
FIG. 4 is a screenshot of a customized browser comprising the method and system according to an embodiment of the design, showing that the user can click on the "Playstation Tours" button within the Playstation hotbutton pop-up.

FIG. 4 is a screenshot of a customized browser comprising the method and system according to an embodiment of the design, showing that the user can click on the "Playstation Tours" button within the Playstation hotbutton pop-up 16.

Figure 5:
FIG. 5 is a screenshot of a customized browser comprising the method and system according to an embodiment of the design, showing that the tour will open in a frame at the bottom border of the screen and the user can step through the list of related links by clicking on the 'Last Site' and 'Next Site' buttons.

FIG. 5 is a screenshot of a customized browser comprising the method and system according to an embodiment of the design, showing that the tour will open in a frame at the bottom border of the screen and the user can step through the "picks of the day" (list of related links which are shown in the Playstation hotbutton pop-up as displayed in FIG. 3) by clicking on the 'Last Site' and 'Next Site' buttons 18.

Figure 6:
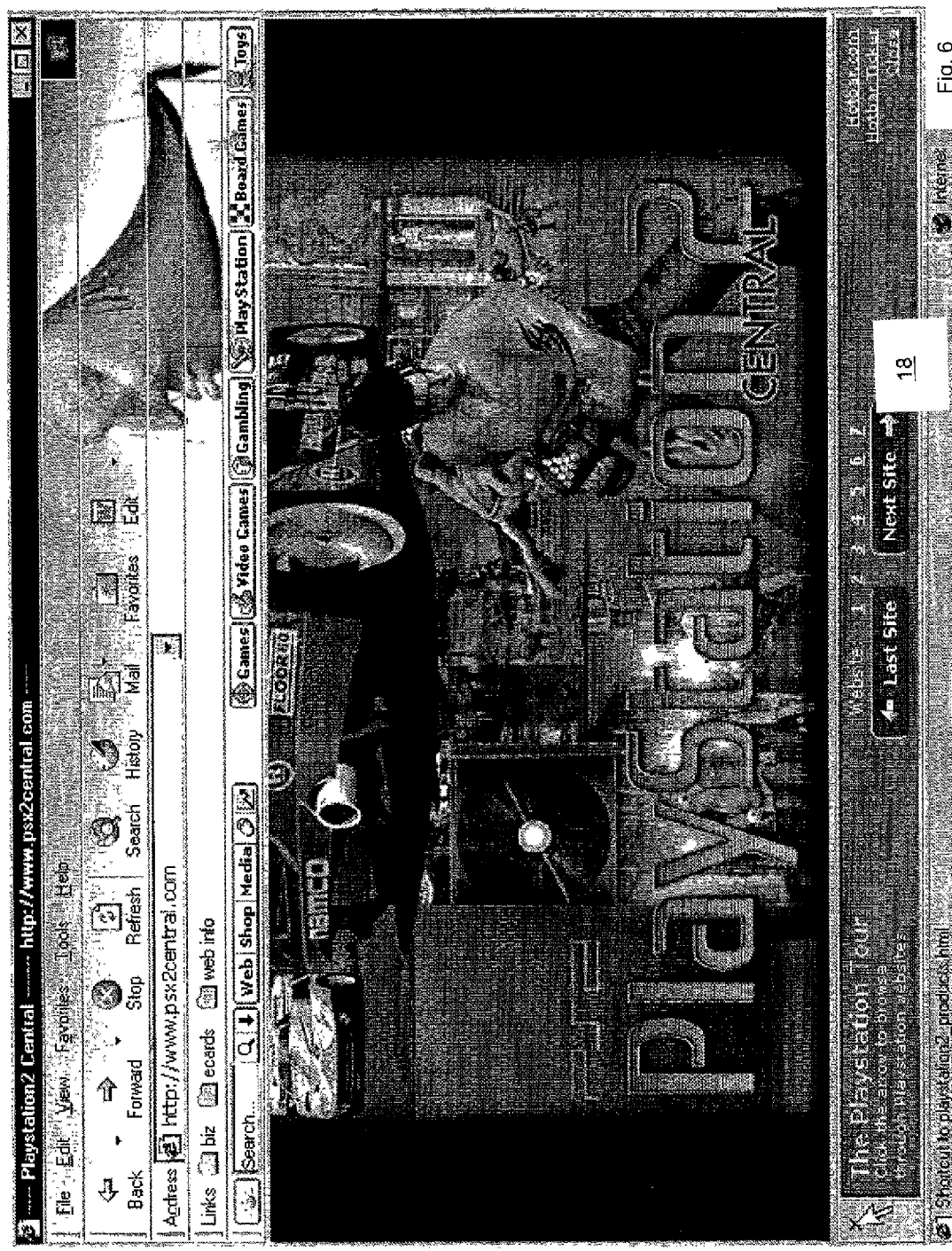
FIG. 6 is a screenshot of a customized browser comprising the method and system according to an embodiment of the design, showing that the user is redirected to the next site in the list and can close the Tour by clicking on the X in the top-left corner of the Tour frame.

FIG. 6 is a screenshot of a customized browser comprising the method and system according to an embodiment of the design, showing that the user is redirected to the next site in the list and can close the Tour by clicking on the X in the top-left corner of the Tour frame.

Figure 7:
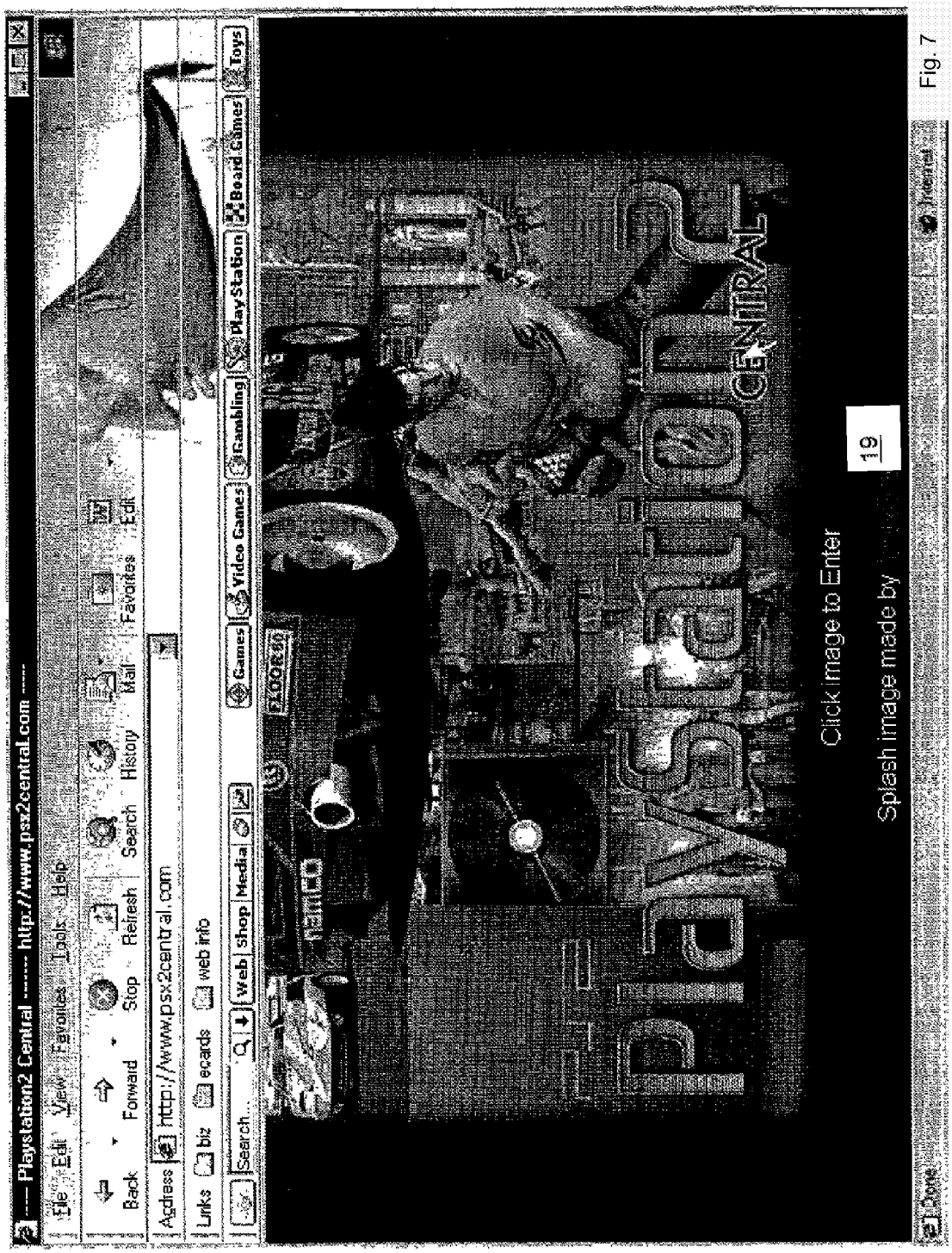
FIG. 7 is a screenshot of a customized browser comprising the method and system according to an embodiment of the design, showing that the Tour frame has been closed.

FIG. 7 is a screenshot of a customized browser 19 comprising the method and system according to an embodiment of the design, showing that the Tour frame has been closed.

The method may provide the on-demand addition of graphic and other information to the browser's toolbar of a web surfer. A plug-in is provided. The plug-in is installed or caused to be installed in the browser of the web surfer. The information is allowed to be dynamically added to and/or modified in the toolbar area of the browser by the action of said plug-in.

The system may provide the on-demand addition of graphic and other information to the browser's toolbar of a web surfer. A service web site is connected to the Internet. A plug-in mechanism provided in the service web site supplies to a web surfer in desire of a plug-in, the plug-in. A mechanism is used to dynamically 1) upload to a browser in which the plug-in has been installed, or 2) for permitting the user of the browser to dynamically download, information to be added to the toolbar area of the browser by the action of the plug-in.

A method and system for providing the on-demand addition of graphic and other information to the browser's toolbar of a web surfer is discussed. A plug-in is installed or caused to be installed in the browser of the web surfer, and the information is allowed to be added to and/or modified in the toolbar area of the browser by the action of the plug-in. The information comprises a skin or a plurality of categorized or rated links, added to the links line of the toolbar. The skin may comprise a message, such as a greeting or an advertisement. The plug-in and the information may be provided to the surfer by a service web site.

The Internet is nowadays in common and widespread use, worldwide. Access to the Internet is gained using a so-called "browser", which is a program running on a PC (personal computer) that permits the user to connect to the Internet through a modem or a network. Generally speaking, Internet browsers are normally created using either the Active-X or the Java languages, although other languages can also be used. Representative examples of such browsers are the Microsoft Internet Explorer, which is an Active-X application, and the Netscape Navigator (or Communicator).

Figure 8:
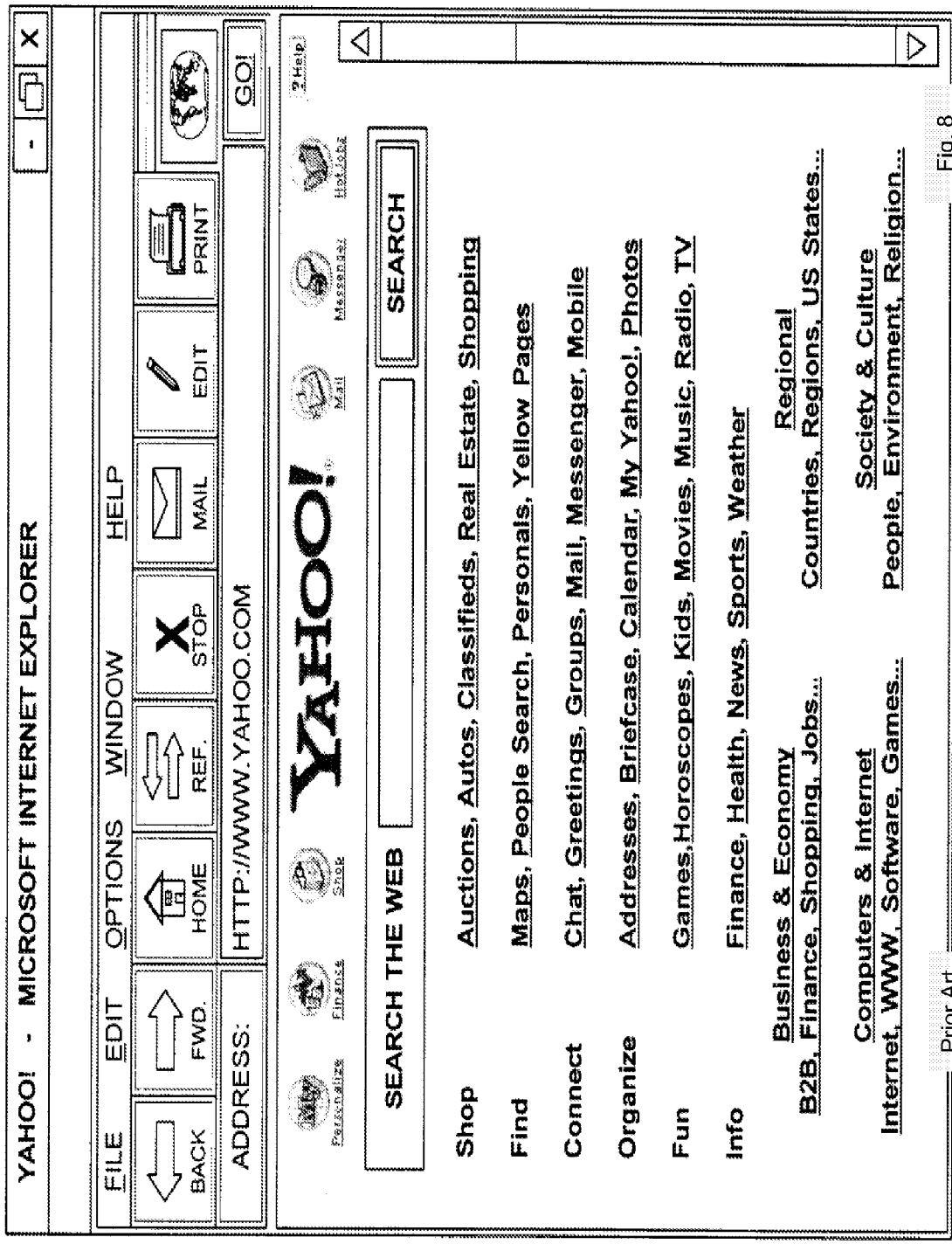
FIG. 8 shows a web page, as seen from a normal Microsoft Internet Explorer browser.

FIG. 8 illustrates a representative Internet Explorer page. The inactive part of the browser 20 is the upper part, the so-called "toolbar", in which menus and function buttons are provided. This part also comprises a "Links" line, where specific links can be installed by the user. This part of the browser 20 is normally not dynamic, and changes only in respect of the contents of the function buttons.

The browser window, on the other hand, is the part of the browser 20 where dynamic information is shown when the user enters a specific web page.

In the example of FIG. 8, the home page of the well known Yahoo! Search engine is shown, with some of the options available to the user who accesses the Yahoo! Web site.

Attempts have been made in the art to functionalize the upper part of the browser 20, so as to permit it to be actively used for a variety of uses. This part has been left accessible by Microsoft on its explorer. The existing solutions, however, are complicated and cumbersome. For instance, NeoPlanet Inc. operates a site where a program can be downloaded to generate a new browser that, inter alia, has the ability to allow change of skin. This program, additionally, includes a list of useful links which are implanted in the browser when the NeoPlanet program is run. This program, however, presents the severe drawback that it is not an add-on to the Explorer, but rather a program that alters the Explorer altogether and, in fact, generates a new browser from it. Because of this fact, a large program (1.3 MB) has to be downloaded and run, and each skin that has to be installed is about 150-300 KB. Apart from the large program volume used, the great disadvantage is that the Microsoft Internet Explorer is not fully preserved, but rather a different browser is generated.

It is thus obvious that it is highly desired to provide a method by which the inactive portion of the browser can be utilized, without the need to generate a different browser.

It is therefore an object of an embodiment of the design to provide a method and system, which permit the owner of a browser to utilize the inactive portion of the browser.

It is another purpose of an embodiment of the design is to provide a method and system that make it possible to change skins using a plug-in for a given browser.

It is a further object of an embodiment of the design to provide a method and a system for dynamically supplying to a user-selected links, and to maintain them on a current basis.

Other purposes and advantages of embodiments of the design will become apparent as the description proceeds.

An embodiment of the design is mainly concerned with Active-X based browsers, although embodiments of the design can be used, mutatis mutandis, also in connection, e.g., with Java-based browsers or browsers based on any other language. Therefore, an embodiment of the design is by no means limited to Active-X based browsers, and is meant to encompass also Java-based browsers. Throughout the description to follow reference will be made to Active-X based programs, and specifically to the Microsoft Internet Explorer, for the sake of brevity.

In one aspect, an embodiment of the design is directed to a method for providing the on-demand addition of graphic and other information to the browser of a web surfer, comprising: providing a plug-in; installing or causing said plug-in to be installed in the browser of said web surfer; and allowing the information to be added to and/or modified in the toolbar area of said browser by the action of said plug-in.

According to a preferred embodiment of the design the plug-in is in the form of an Active-X or the like element. However, plug-ins other than Active-X elements can of course be provided, as will be apparent to the skilled person.

According to a preferred embodiment of the design the information comprises a skin. According to another preferred embodiment of the design the information comprises a plurality of links, and said plurality of links are added to the links line of the toolbar. Furthermore, the links can be suitably categorized and/or rated. Throughout this specification whenever reference is made to "links" it should also be understood as including the "favorites" or the like part of the toolbar, and any other similar functional equivalent, all of which is included herein under the term "link", for the sake of brevity.

According to another preferred embodiment of the design the skin comprises a message, which may be, e.g., a greeting, or may comprise an advertisement.

Preferably, but non-limitatively, the plug-in and the information are provided to the surfer by a service web site. However, either or both of the plug-in and the information may be provided to the surfer by a web site that is not a service site. Such other web site would then function as a part of a service system. Thus, in another aspect the design is directed to a system for providing the on-demand addition of graphic and other information to the browser's toolbar of a web surfer, comprising a service web site and one or more other sites each of which is authorized to provide to surfers the plug-in and/or information installable by said plug-in.

When the information is a skin and is provided to the surfer by a site other than a service site, the contents of the skin can be related to the site from which it is downloaded, or to any other pertinent subject.

An embodiment of the design is further directed to a system for providing the on-demand addition of graphic and other information to the browser's toolbar of a web surfer, comprising: a service web site connected to the Internet; means provided in said web site to supply to a web surfer in desire of it a plug-in; and means for uploading to a browser in which said plug-in has been installed, or for permitting the user of said browser to download, information to be added to the toolbar area of said browser by the action of said plug-in.

As stated above, the system may further comprise one or more web sites other than a service site, said other web sites being equipped with means for providing the information to the surfer.

An embodiment of the design also encompasses a service web site for providing the on-demand addition of graphic and other information to the browser's toolbar of a web surfer, comprising: At least one connection to the Internet; means for supplying to a web surfer in desire of it a plug-in; and means for uploading to a browser in which said plug-in has been installed, or for permitting the user of said browser to download, information to be added to the toolbar area of said browser by the action of said plug-in.

An embodiment of the design is also directed to a plug-in for a browser, characterized in that it is provided with means suitable to replace the skin of the browser with an image provided to it.

The same or another plug-in for a browser can be provided with means suitable to add to the links line of the browser's toolbar links provided to it by a service web site.

FIG. 8 shows a web page, as seen from a normal Microsoft Internet Explorer browser.

Figure 9:
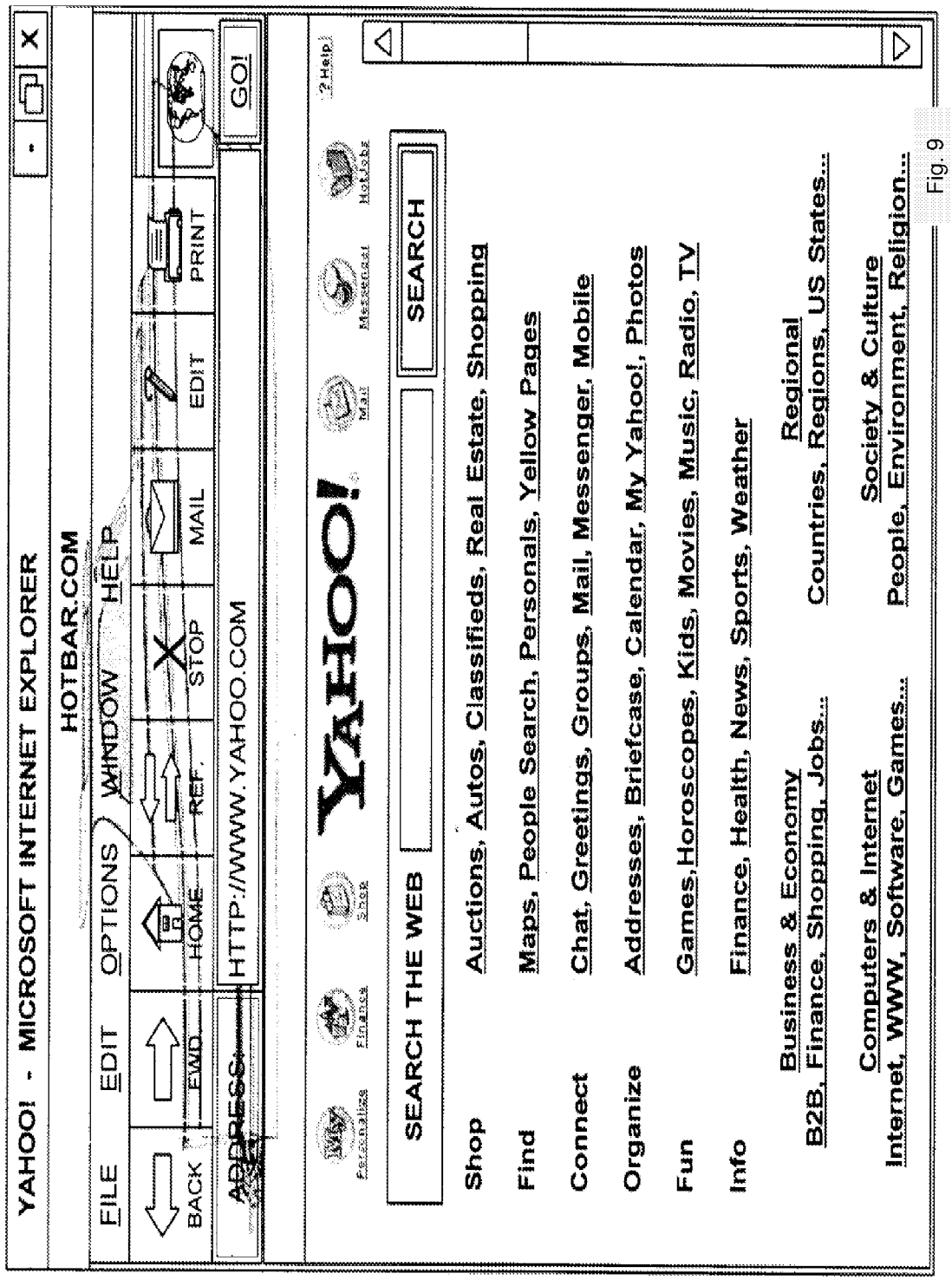
FIG. 9 shows a browser in which the skin of the toolbar has been changed, according to one preferred embodiment of the design.

FIG. 9 shows a browser 22 in which the skin of the toolbar has been changed, according to one preferred embodiment of the design.

Figure 10:
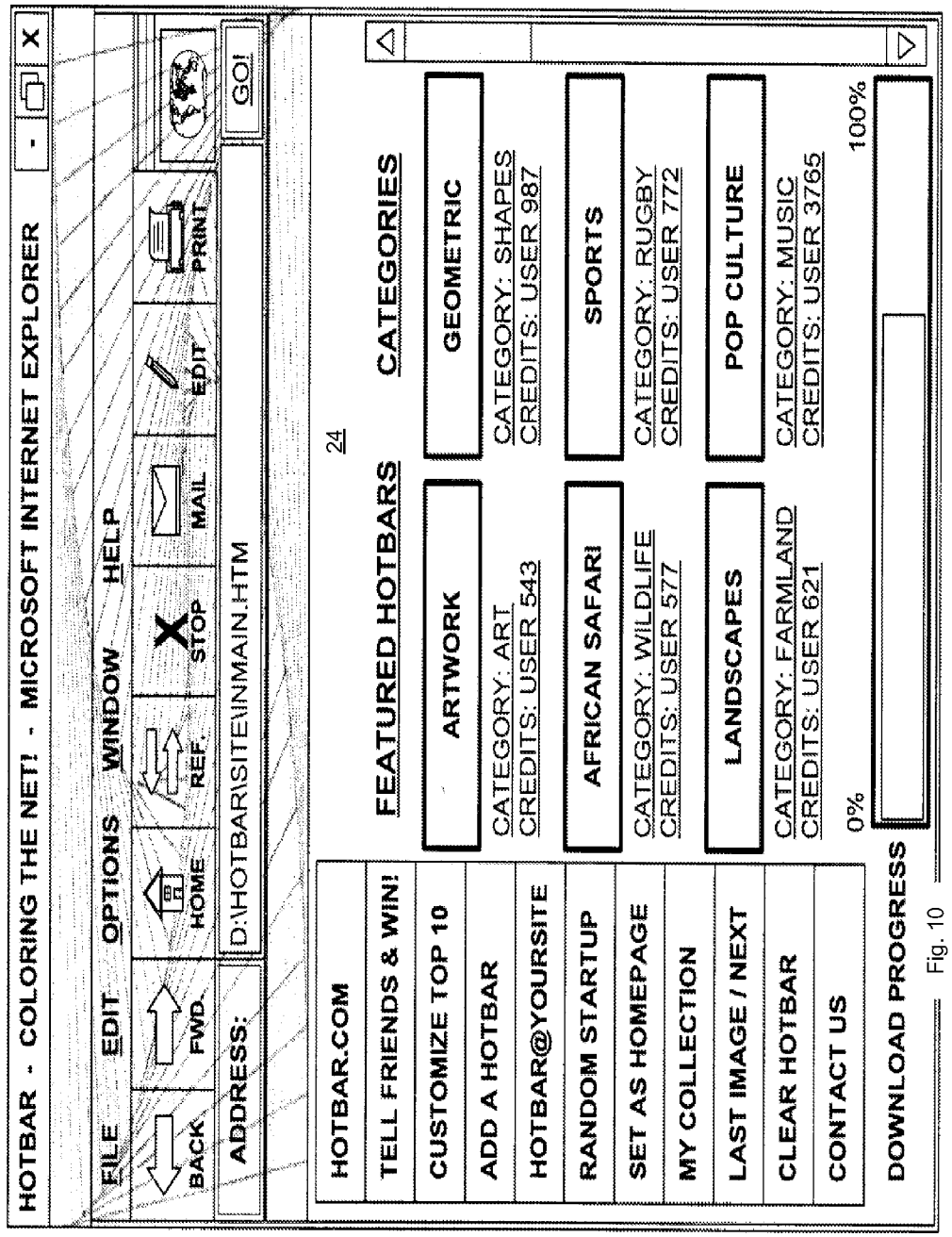
FIG. 10 shows an example of a page from a service web site, according to a preferred embodiment of the design, from which the user can obtain the desired services.

FIG. 10 shows an example of a page 24 from a service web site, according to a preferred embodiment of the design, from which the user can obtain the desired services.

Figure 11:
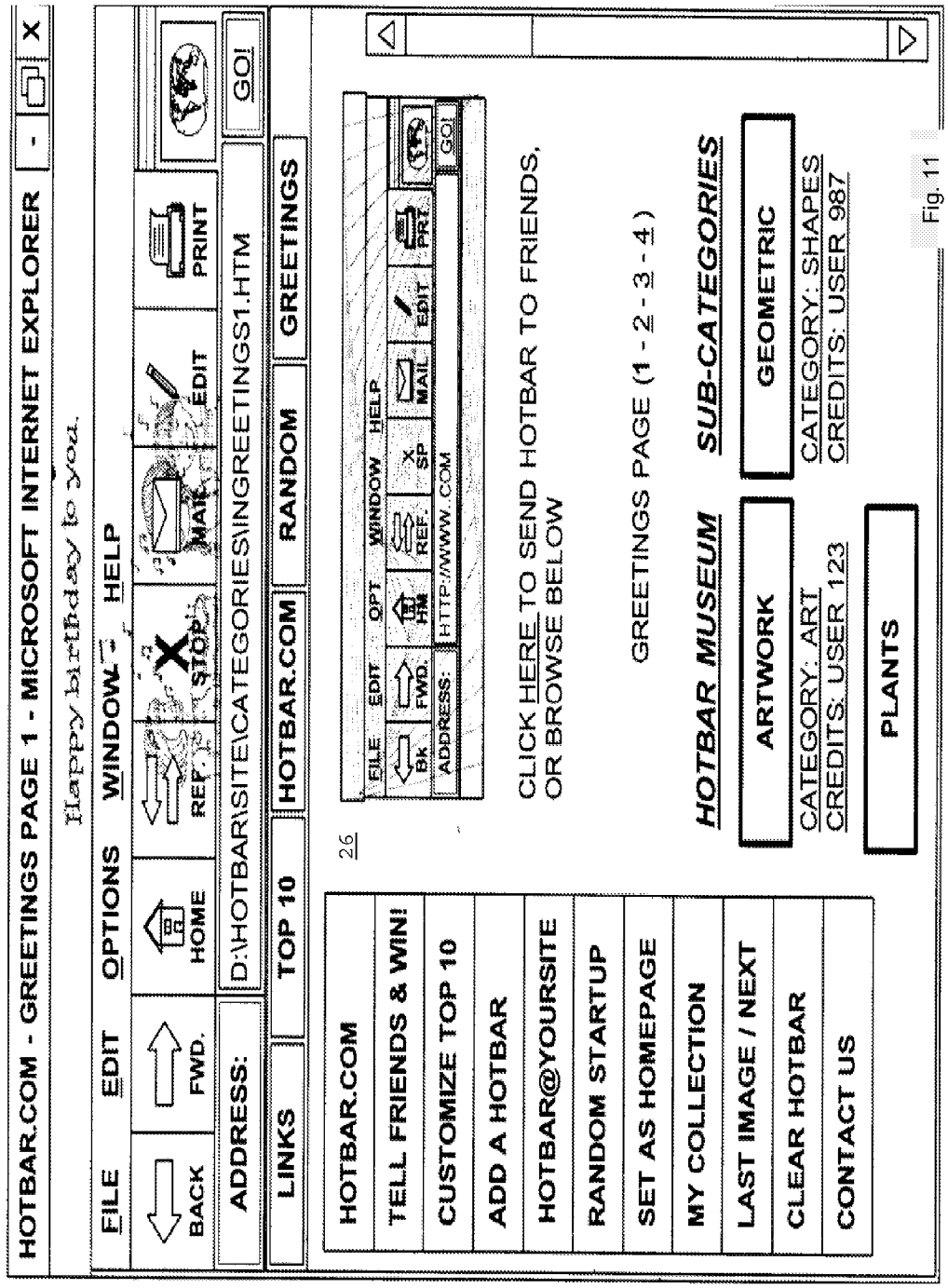
FIG. 11 is an example of another page of a service web site, including a greetings message, according to a preferred embodiment of the design.

FIG. 11 is an example of another page 26 of a service web site, including a greetings message, according to a preferred embodiment of the design.

Figure 12:
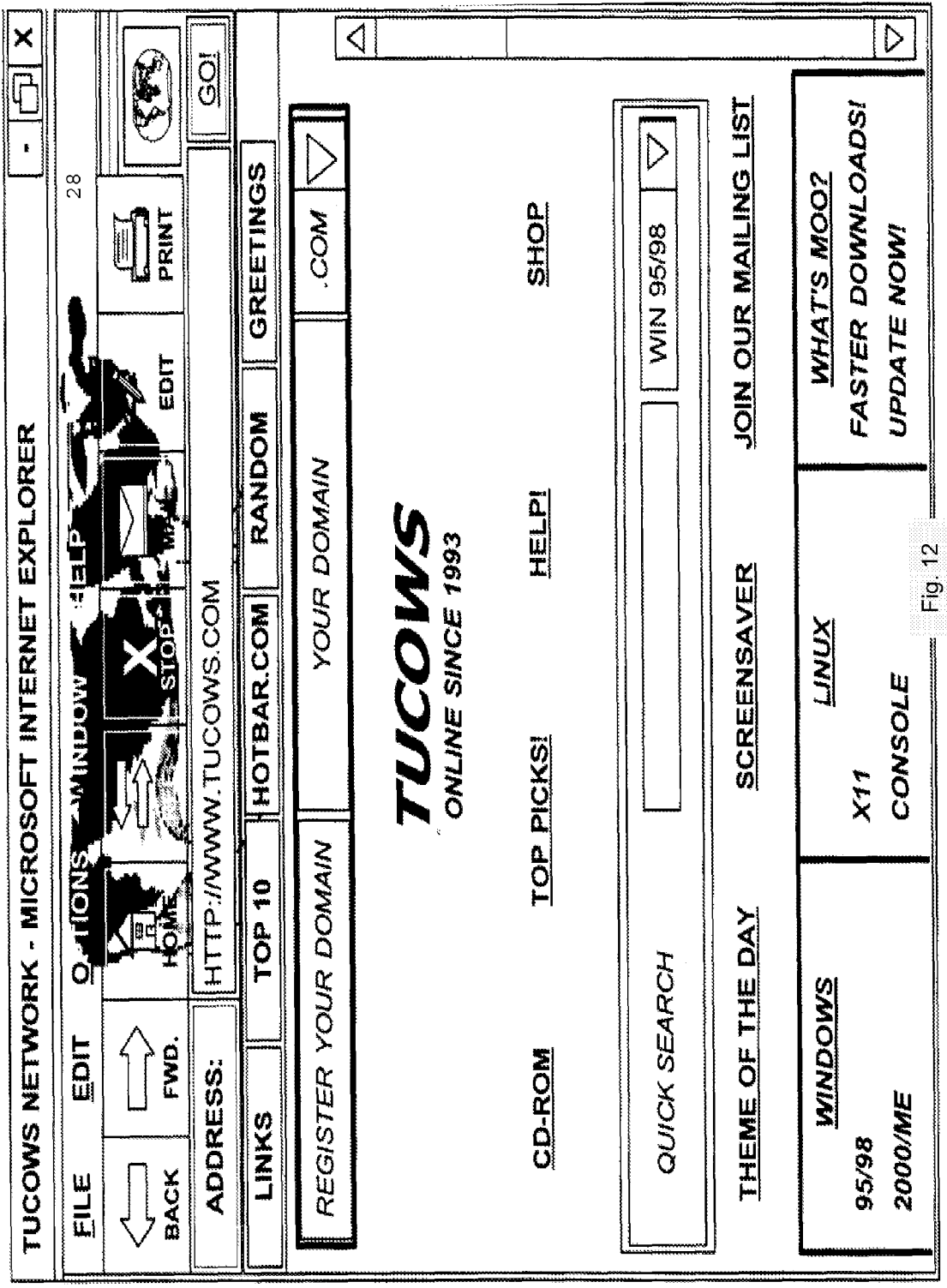
FIG. 12 shows the result of another preferred embodiment of the design, where the toolbar skin is provided to the user not by a service web site, but rather by a regular web site, and contains advertising contents.

FIG. 12 shows the result of another preferred embodiment of the design, where the toolbar skin 28 is provided to the user not by a service web site, but rather by a regular web site, and contains advertising contents.

Figure 13:
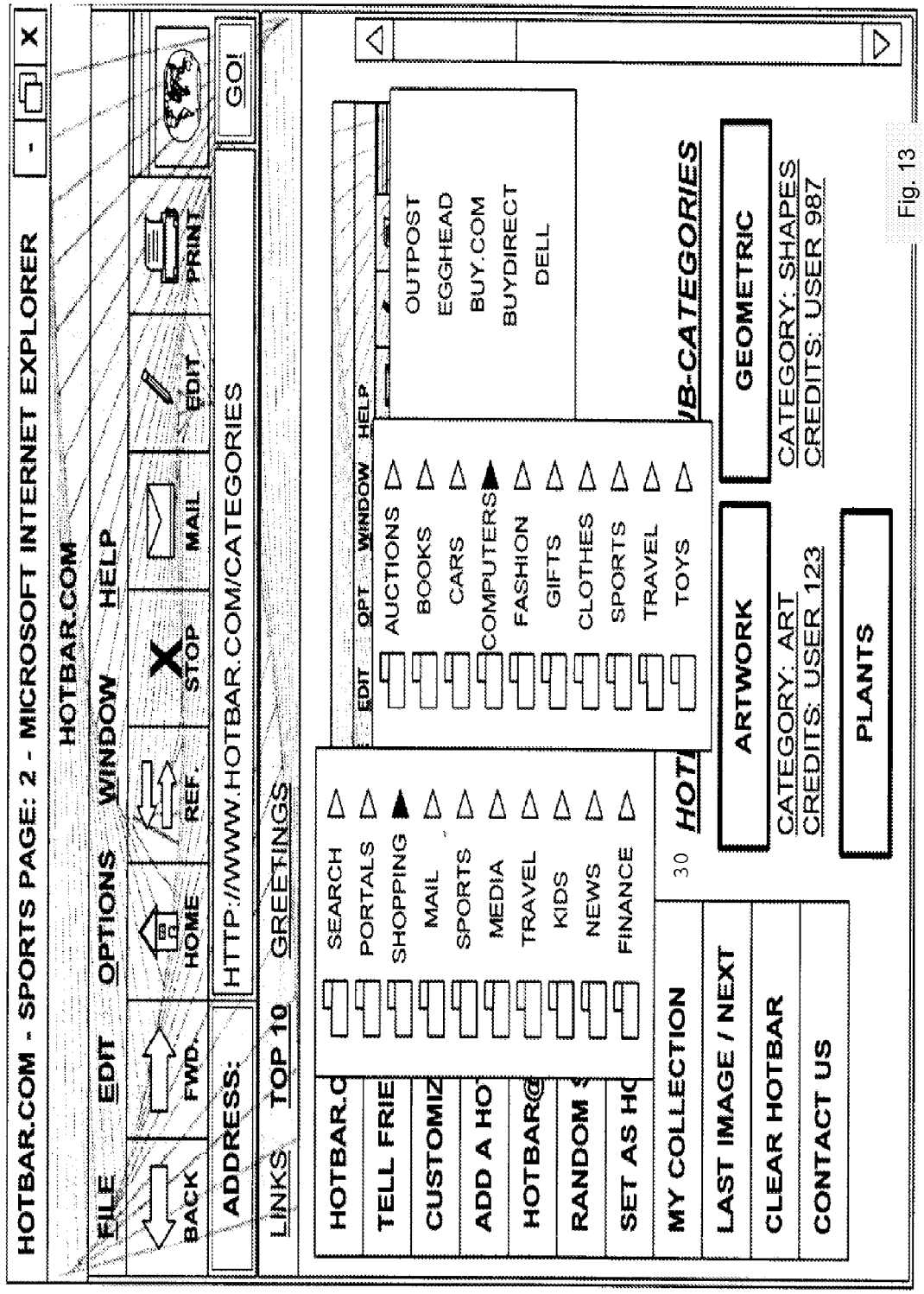
FIG. 13 illustrates a selection of links available from a service web site for uploading by the user, according to a further preferred embodiment of the design.

FIG. 13 illustrates a selection of links 30 available from a service web site for uploading by the user, according to a further preferred embodiment of the design.

In the context of this application, "plug-in" means any program that can function in cooperation with a browser, and that can effect changes in the functions and/or appearance of the browser, without changing its main structure.

"Service web site" or "service site" is meant to indicate a web site having as one of its primary purposes that of supplying services to the users of the system of the design. Particularly, the service site may supply plug-ins to new users, or may allow the download of skins or links by existing users.

Looking now at FIG. 9, and comparing it to FIG. 8, it can be seen that the browser 22 has changed its appearance in the toolbar area. This has been effected first by downloading and installing a plug-in that permits to effect changes in the toolbar zone, and then by downloading the desired skin, in the form of a graphic file. Graphic files containing skins are preferably—but not limitatively—downloaded in compressed format, to speed-up the process. Any suitable and known compression method and compressed files, such as ZIP or JPEG files, or modifications thereof, can be used, provided the plug-in is equipped with the relevant decompression utility.

The plug-in to be used in the system of the design can be of any suitable type. According to a preferred embodiment of the design the plug-in is created using Active-X architecture. According to a preferred embodiment of the design the Active-X plug-in is downloaded from a web site, or otherwise supplied as a file, to the browser 22. In a preferred embodiment of the design the plug-in is verified using the Verisign key or similar method. At the will of the user (by previous approval of this installation) the plug-in is installed in the browser 22. The plug-in now permits the user to carry out a variety of operations that can be effected using the Html/Javascript language. Installation of the plug-in can be effected by any suitable procedure, which is well known to the surfer, and therefore this procedure is not described herein in detail, for the sake of brevity.

EXAMPLE

Schematic Description of an ActiveX Plug-in Functionality

The ActiveX functionality, according to one particular preferred embodiment of the design, is divided into 2 main parts:

1. Downloading a Desired Skin Image and Setting it as the Current Toolbar's Skin.

1. The html page gives a JavaScript command to the ActiveX Control (which is installed previously, upon entering the site) to download a specific Skin image.

2. The ActiveX control initiates an http connection with the desired skin image file. The file may be situated on any web site on the net and is in BMP format or in XIP format, or in any other suitable compressed or uncompressed format. (XIP format is a compressed format based on Z compression public library).

3. The file is downloaded and saved (after decompression) in BMP format.

4. Assigning values to the Registry Keys:

a.

[HKEY_CURRENT_USER\Software\Microsoft\Internet\Explorer\Toolbar] "backbitmap" and [HKEY_CURRENT_USER\Software\Microsoft\Explorer\Toolbar] "backbitmapIE5" holds the path+name of the BMP file, as the Toolbar Background image of the Microsoft Internet Explorer Browser. (Additional Information is available at the Microsoft website).

b.

[HKEY_CURRENT_USER\Software\Microsoft\Internet Explorer\Toolbar\WebBrowser] "ITBarLayout" holds the layout of the different elements on the Explorer's Toolbar. (if the Links line is closed, where exactly is located the Address line etc.) A Default value is assigned to this key in order to open the Links line, so that it will fit the Skin image.

5. After setting those values a refresh action should take place in order to refresh the current display. This is done by sending the active Explorer Window a double F11 command (The first F11 command makes the explorer window full screened, the second F11 retrieves it to the original status) and refreshes the Toolbar Skin Image. (In case the links line was closed, (paragraph 5.) before the new setting, a new browser window is opened (with the Links line opened) and the current window is closed).

2. Downloading Selected Links and Adding/Updating them in the Favorites/Links Line of the Toolbar's Browser.

1. The html page gives a JavaScript command to the ActiveX Control (which is installed previously, upon entering the site) to download a group of Links files.

Every file holds a list of links that should be present on the user's favorites/links folder.

Example (Hotbar Default links file, Enhanced Index of sport related links, Enhanced Index of sites located in France), this combination of files allow the user to personalize his dynamic content configuration.

2. The links files are downloaded from the service Website after checking each one of them for the edited date. Only newer files than those already local are downloaded.

3. For faster download, the links files are downloaded compressed in the XIP format (based on Z compression public library) and decompressed by the ActiveX control.

4. The links files hold the following information:

a. A record for every icon file that should be downloaded.

b. A record for every Link Shortcut that should be created/present, containing data for: The Folder and Name of the Link Shortcut, The URL it is pointing to, The Icon file.

5. The Group of files is united into one Links file. This file is processed and compared to the former Links file (the former links configuration). New link shortcuts are been added by generating a URL file in the proper folder.

Old Links (that do not appear in the New Links file) are deleted by deleting the proper URL file.

6. The icon files (.ICO, .DLL) are downloaded, if they are not already present.

Plug-ins generated according to the above are of relatively low volume, e.g., of the order of 80 KB.

FIG. 10 shows a page 24 from a service site (called, in this example, "Hotbar"). The Hotbar site contains a large number of skins, classified, e.g., by category, and the skins are shown as samples in the web page. The user who has already installed the plug-in may choose a skin that suits him, and can download it by selecting it in any suitable way, e.g., by clicking it or a link related to it. This selection will eventually result in the installation of the skin in the toolbar area of the browser, as shown in FIG. 8.

Skins of this type are of very low volume and, in compressed form, are of a size of the order of 40-70 KB.

Another important embodiment of the design is illustrated in FIG. 11. According to this preferred embodiment of the design a skin can be downloaded not for personal use in the browser, but rather for delivery as a message to a third party. Thus, according to the example of FIG. 11, messages such as a greeting can be selected and attached to a message sent to a third party, whether directly from the Hotbar (service) web site, or as an e-mail message containing a link to a service site. The recipient then installs the skin in his browser's toolbar and receives the greeting simultaneously. The plug-in must be installed, if it was not previously installed, before the skin can be installed.

According to a further preferred embodiment of the design, a suitable skin is provided to a site that may permit to download it to any browser provided with a plug-in of the design. This is illustrated in FIG. 12, which shows the home page of the well-known TUCOWS web site. The skin 28 added to the browser's toolbar maintains the TUCOWS motif. Thus, a site such as TUCOWS may be licensed to offer the download of a matching skin (and perhaps also of the plug-in) from its site. This, as will be easily apparent, is a powerful advertisement vehicle, since the skin 28 remains in the browser's toolbar also after leaving the site, for as long as the user does not decide to replace it with another skin.

According to yet another preferred embodiment of the design, the plug-in also permits to upload to the browser's toolbar, e.g., in the links line, selected links to be used by the user at his convenience. The user may select to upload selected categories, or may upload a package of categorized links, for later consideration. Thus, it is possible to offer to the user links that have been previously categorized and rated, possibly along with promotional links identified as commercial advertisements. Uploading of the link information can, of course, be effected only when the user connects to a service site.

As will be apparent to the skilled person, the designs solves the problem of effectively and usefully using the toolbar area of the browser for the aesthetic pleasure of the user, for promotional and advertisement purposes, and for any other purpose. It further permits to supply information of general and commercial interest, in the form of preselected links to be added to the toolbar, which is a convenient and useful service for many surfers who do not have the time to categorize and rate web sites of interest. The design thus provides in a very convenient way services which to date were not provided, or were provided in a cumbersome and inconvenient manner.

A method may provide the on-demand addition of graphic and other information to the browser's toolbar of a web surfer. The plug-in is provided. The plug-in is installed or caused to be installed in the browser of the web surfer. The information is allowed to be added to and/or modified in the toolbar area of the browser by the action of the plug-in. The information may include a skin. The information may include a plurality of links, and the plurality of links are added to the links line of the toolbar. The links may be categorized and rated. The skin may include a message such as a greeting or advertisement. The plug-in and the information may be provided to the surfer by a service web site. The information may be provided to the surfer by a web site other than a service site. The information may be a skin, and the contents of the skin are related to the site from which it is downloaded. The plug-in may be in the form of an Active-X element.

A system may provide the on-demand addition of graphic and other information to the browser's toolbar of a web surfer. A service web site is connected to the Internet. A mechanism is provided in the web site to supply to a web surfer in desire of it a plug-in. A mechanism 1) for uploading to a browser in which the plug-in has been installed, or 2) for permitting the user of the browser to download, information to be added to the toolbar area of the browser by the action of the plug-in. The information may include a plurality of skins. The information may include a plurality of links, and the plurality of links are suitable to be added to the links line of the toolbar. The links may be categorized. The links may be rated. The skins may include a message such as a greeting or an advertisement. The plug-in and the information may be provided to the surfer by a service web site. A web site other than a service site, where this other web site is equipped with a mechanism for providing the information to the surfer. The information may be a skin, and the contents of the skin are related to the site from which it is downloaded. The plug-in may be in the form of an Active-X element.

A service web site may provide the on-demand addition of graphic and other information to the browser's toolbar of a web surfer. At least one connection exists to the Internet. A supply mechanism supplies a web surfer in desire of a plug-in, the plug in. A mechanism 1) for uploading to a browser in which the plug-in has been installed, or 2) for permitting the user of the browser to download, information to be added to the toolbar area of the browser by the action of the plug-in. The plug-in for a browser is characterized in that it is provided with mechanism suitable to replace the skin of the browser's toolbar with an image provided to it. The plug-in is in the form of an Active-X element. The system may provide the on-demand addition of graphic and other information to the browser's toolbar of a web surfer. A service web site and one or more other sites are part of the system, each of which is authorized to provide to surfers the plug-in and/or information installable by the plug-in.

Here are disclosed various systems and methods for customizing electronic messages wherein a user may upload and install executable code for providing a virtual toolbar within an existing electronic message program. In certain embodiments, the executable code may be provided as a plug-in to the electronic message program. After installing the executable code, the user is presented with the virtual toolbar when the electronic message program, or a new electronic message within the program, is opened. The virtual toolbar may be disposed separately from a native toolbar of the electronic message program. In certain embodiments, the virtual toolbar may be disposed between a native toolbar and a message input window of the electronic message program. The virtual toolbar may include a plurality of virtual buttons for selecting different content, or categories of content, that can be included within an electronic message.

Upon selecting a virtual button, a separate window may be displayed to the user that includes a plurality of selectable content associated with the virtual button. The window may additionally include listings of one or more subcategories of associated content. Available content may include holiday-themed content, visual images such as artwork and photography, animations, audio content, audio/visual content, and business-formatted content. Sub-categories may include any generic group of content, such, as animal scenes, nature scenes, world landmarks, and so forth.

The selectable content may be stored locally on a central content server and may therefore be updated without having to update a plurality of plug-ins stored on a plurality of users' computer terminals. In certain embodiments, the content may not be permanently stored on a user's computer terminal at all. Instead, the virtual buttons provided by the plug-in may contain a link to a page stored on the central content server. Accordingly, only the page need be updated to update available content. The central content server may also change attributes of the virtual toolbar or the virtual buttons whenever the plug-in is activated and accesses the central content server over a computer network.

The user may select particular content from the displayed list or lists for inclusion in an electronic message, and may also input text to the message in a standard manner. A user may select content as default content for inclusion in future electronic messages, if the user desires. In such case, the selection of default content may be stored locally at the user's computer terminal or at the central content server, or a combination of both.

When an electronic message with selected or default content is transmitted to another user, the message may simply contain any user-inputted text and a call to a network address location of the content on the central content server, rather than a data file containing the content itself in order to conserve the data size of the electronic message. When the second user opens a received electronic message with the call, the content is generally transmitted from the central content server for display when the received electronic message is opened or may also be embedded in the e-mail transmitted. The second user is not required to have the plug-in to receive or view the content selected by the first user.

Figure 14:
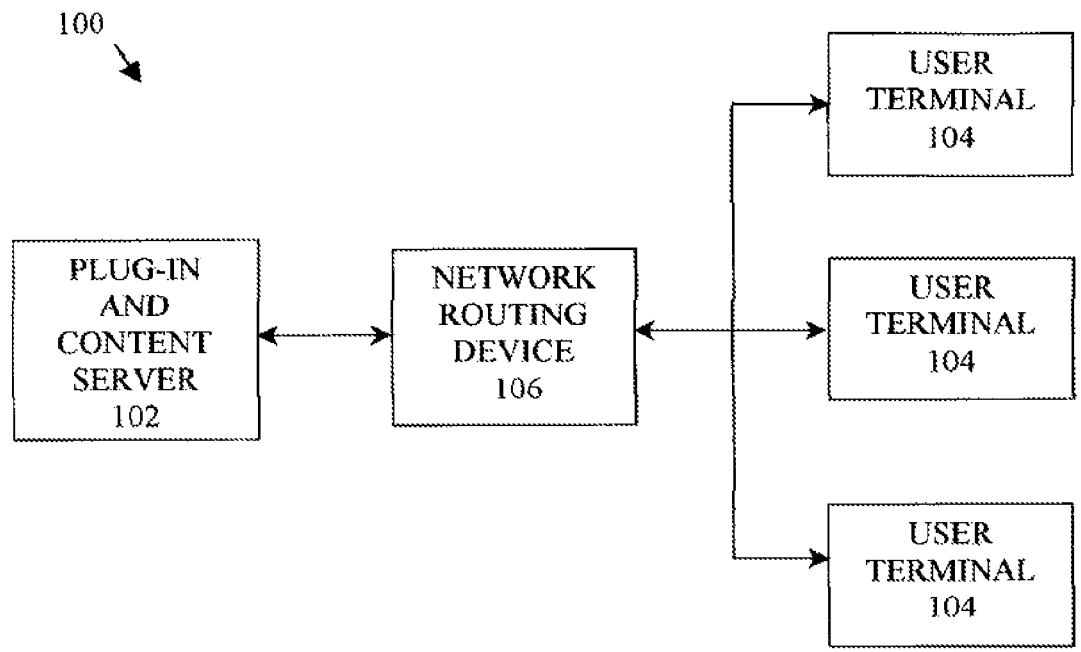
FIG. 14 is a schematic diagram of an exemplary computer network.

Further aspects of the present disclosure will be more readily appreciated upon review of the detailed description of the preferred embodiments, included below, when taken in conjunction with the accompanying drawings, of which:

FIG. 14 is a schematic diagram of an exemplary computer network.

Figure 15:
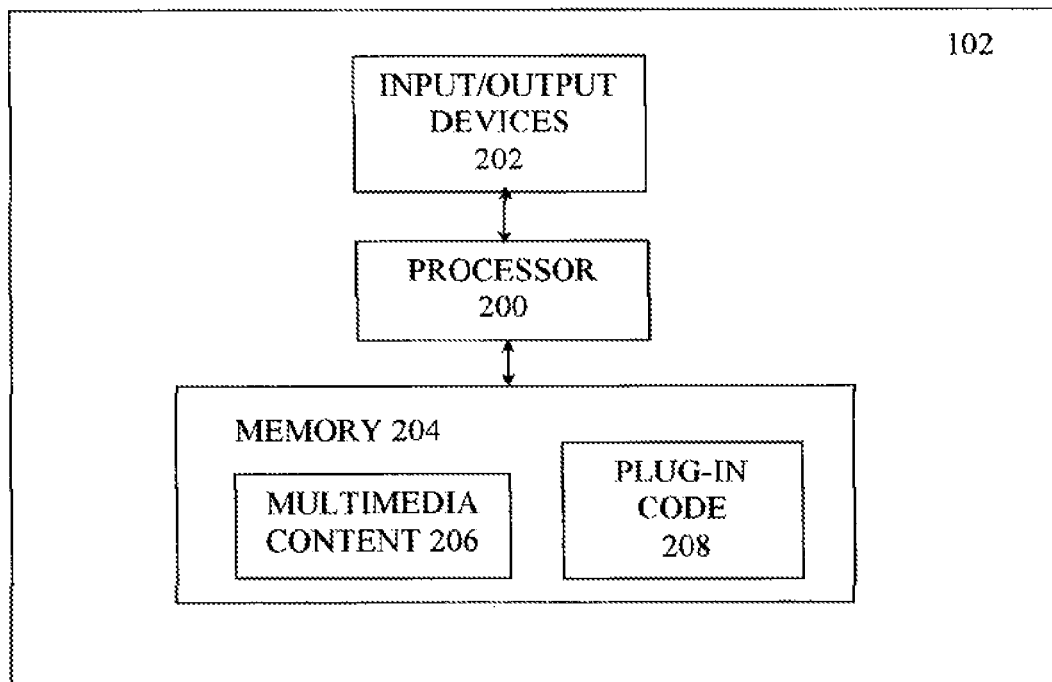
FIG. 15 is a schematic diagram of the plug-in and content server of FIG. 14, according to certain embodiments of the present disclosure.

FIG. 15 is a schematic diagram of the plug-in and content server of FIG. 14, according to certain embodiments of the present disclosure.

Figure 16:
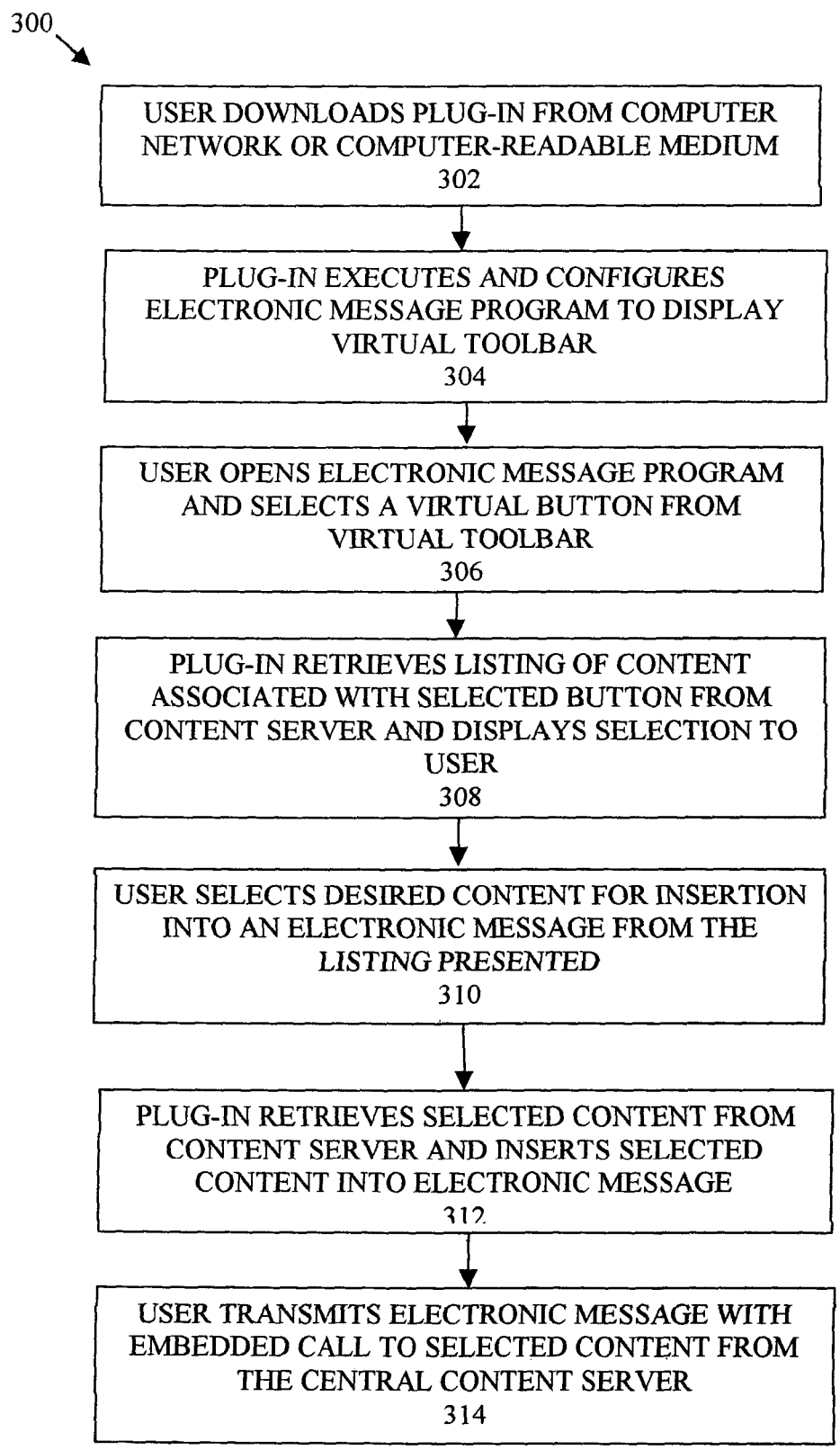
FIG. 16 is a flowchart depicting a process for creating customized electronic mail messages using the plug-in, according to certain embodiments of the present disclosure.

FIG. 16 is a flowchart depicting a process for creating customized electronic mail messages using the plug-in, according to certain embodiments of the present disclosure.

Figure 17:
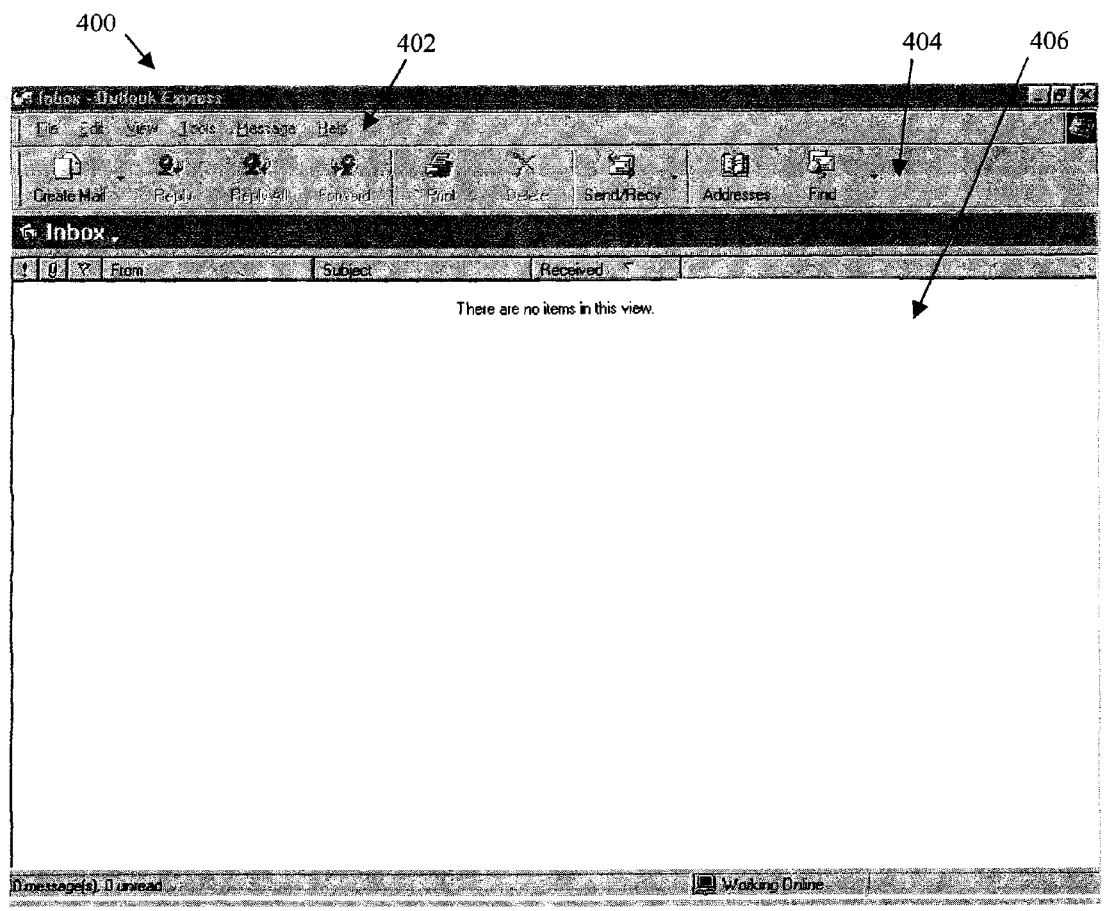

FIG. 17 is an illustration of a prior art main window of an exemplary electronic message program, which may be displayed on the user terminal of FIG. 14 prior to installation of the plug-in.

Figure 18:
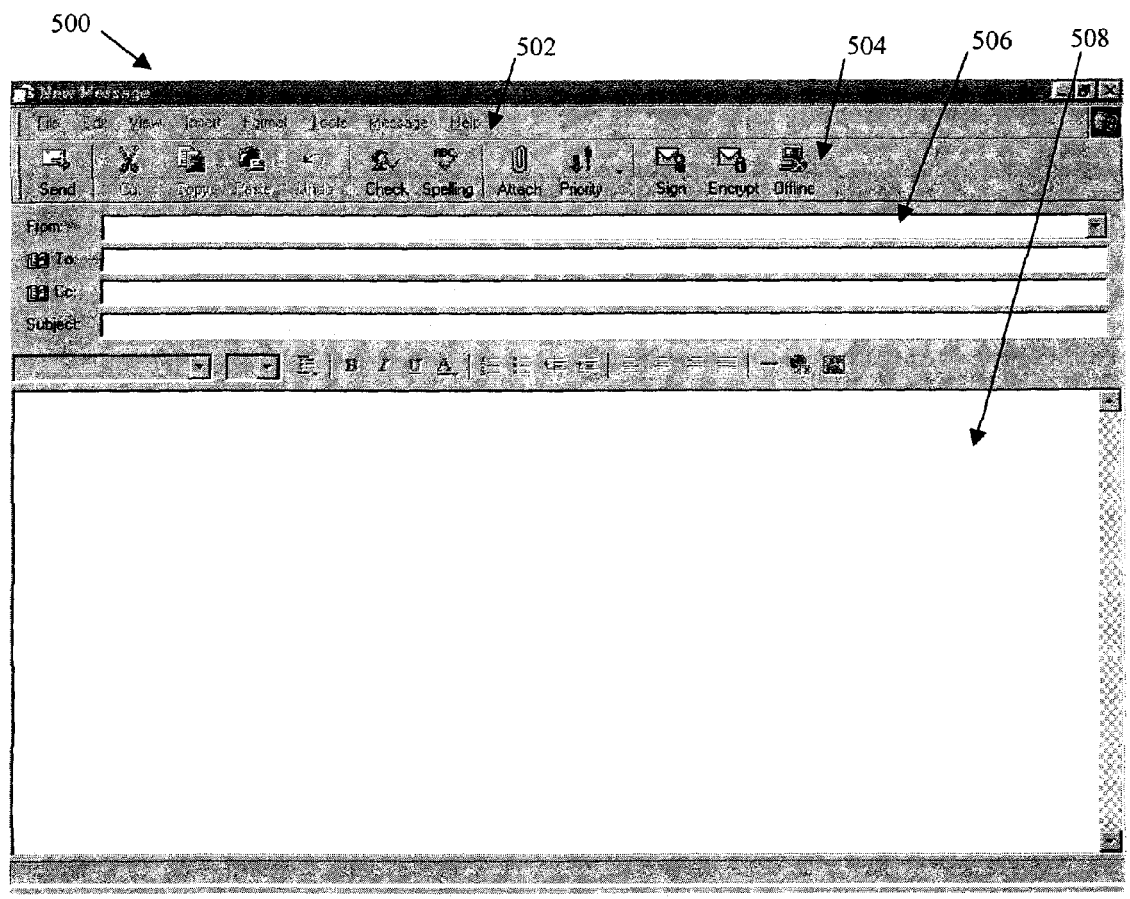

FIG. 18 is an illustration of a prior art electronic message window of an exemplary electronic message program, which may be displayed on the user terminal of FIG. 14 prior to installation of the plug-in.

Figure 19:
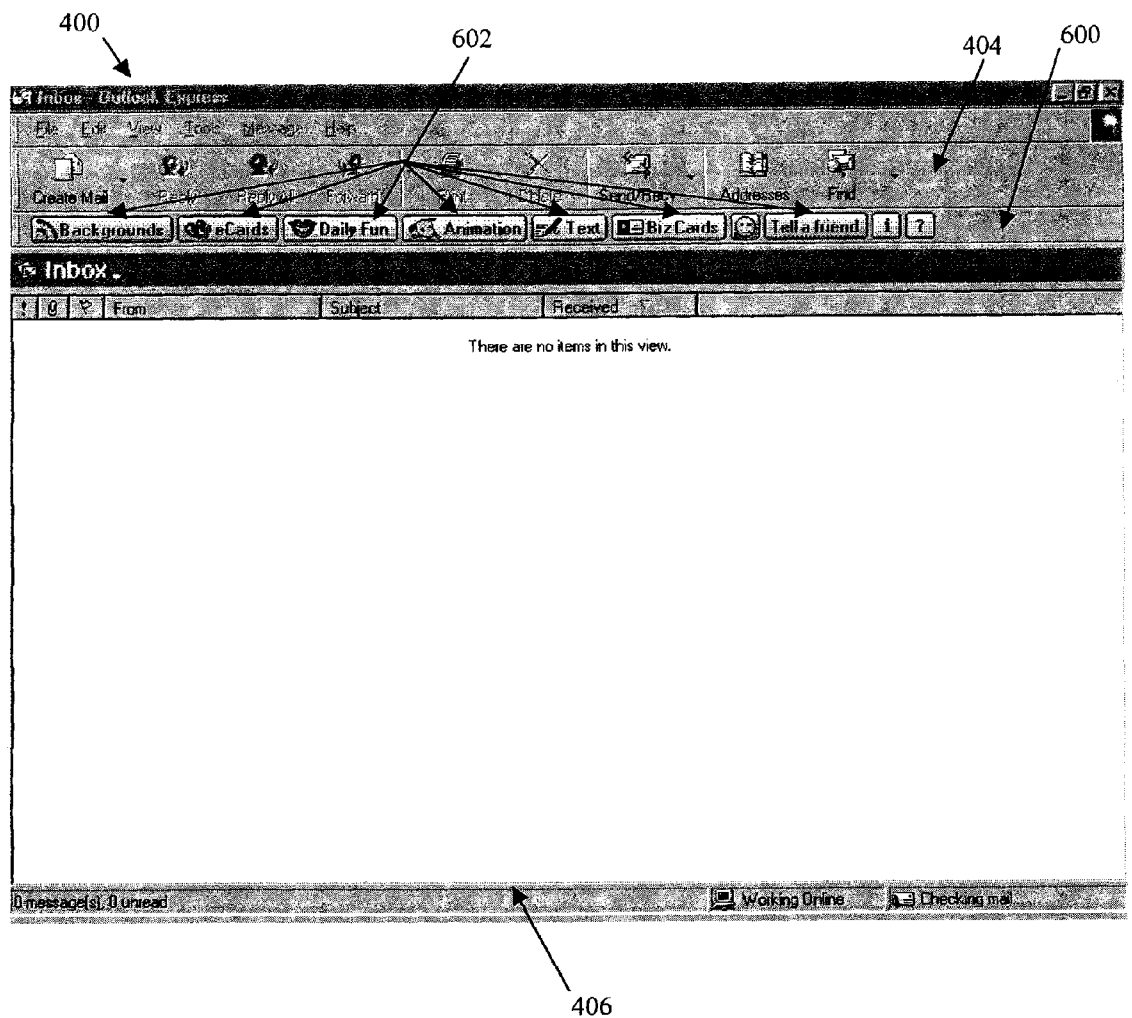
FIG. 19 is an illustration of a main window of an electronic message program including an exemplary virtual toolbar for inserting content into an electronic message, which toolbar may be displayed on the user terminal of FIG. 14 after installation of the plug-in, according to certain embodiments of the present disclosure.

FIG. 19 is an illustration of a main window of an electronic message program including an exemplary virtual toolbar for inserting content into an electronic message, which toolbar may be displayed on the user terminal of FIG. 14 after installation of the plug-in, according to certain embodiments of the present disclosure.

Figure 20:
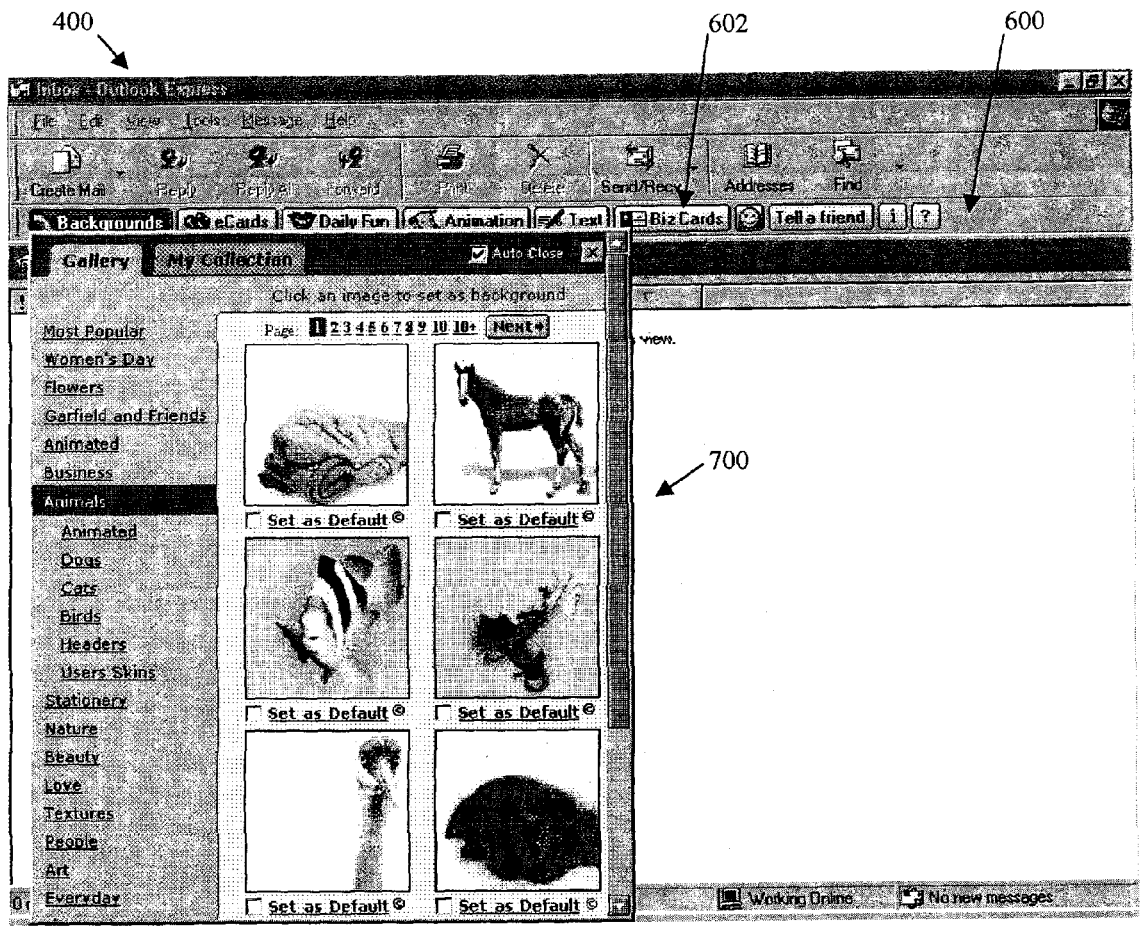
FIG. 20 is an illustration of a first exemplary content window displaying available content and sub-categories of content associated with a virtual button of the virtual toolbar of FIG. 19, according to certain embodiments of the present disclosure.

FIG. 20 is an illustration of a first exemplary content window displaying available content and sub-categories of content associated with a virtual button of the virtual toolbar of FIG. 19, according to certain embodiments of the present disclosure.

Figure 21:
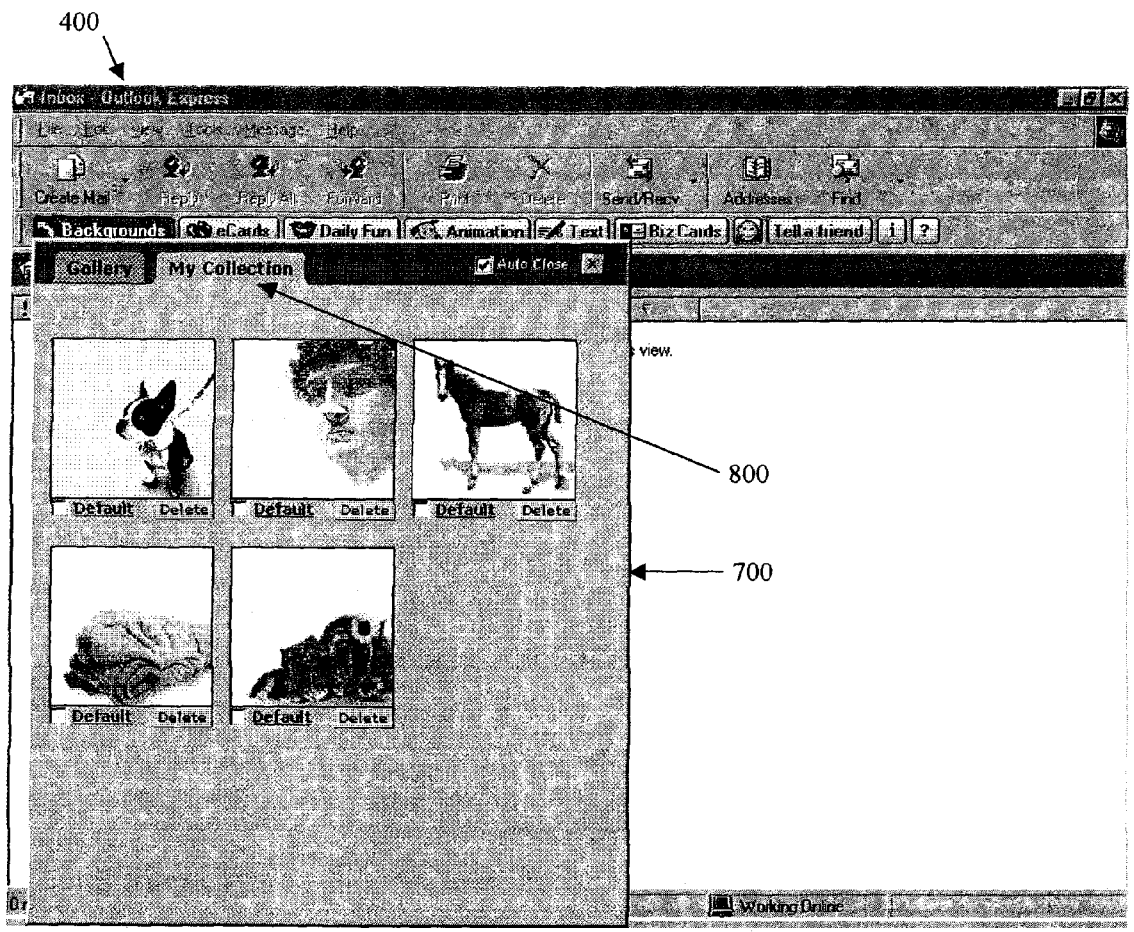
FIG. 21 is an illustration of a second exemplary content window displaying available content, according to certain embodiments of the present disclosure.

FIG. 21 is an illustration of a second exemplary content window displaying available content, according to certain embodiments of the present disclosure.

Figure 22:
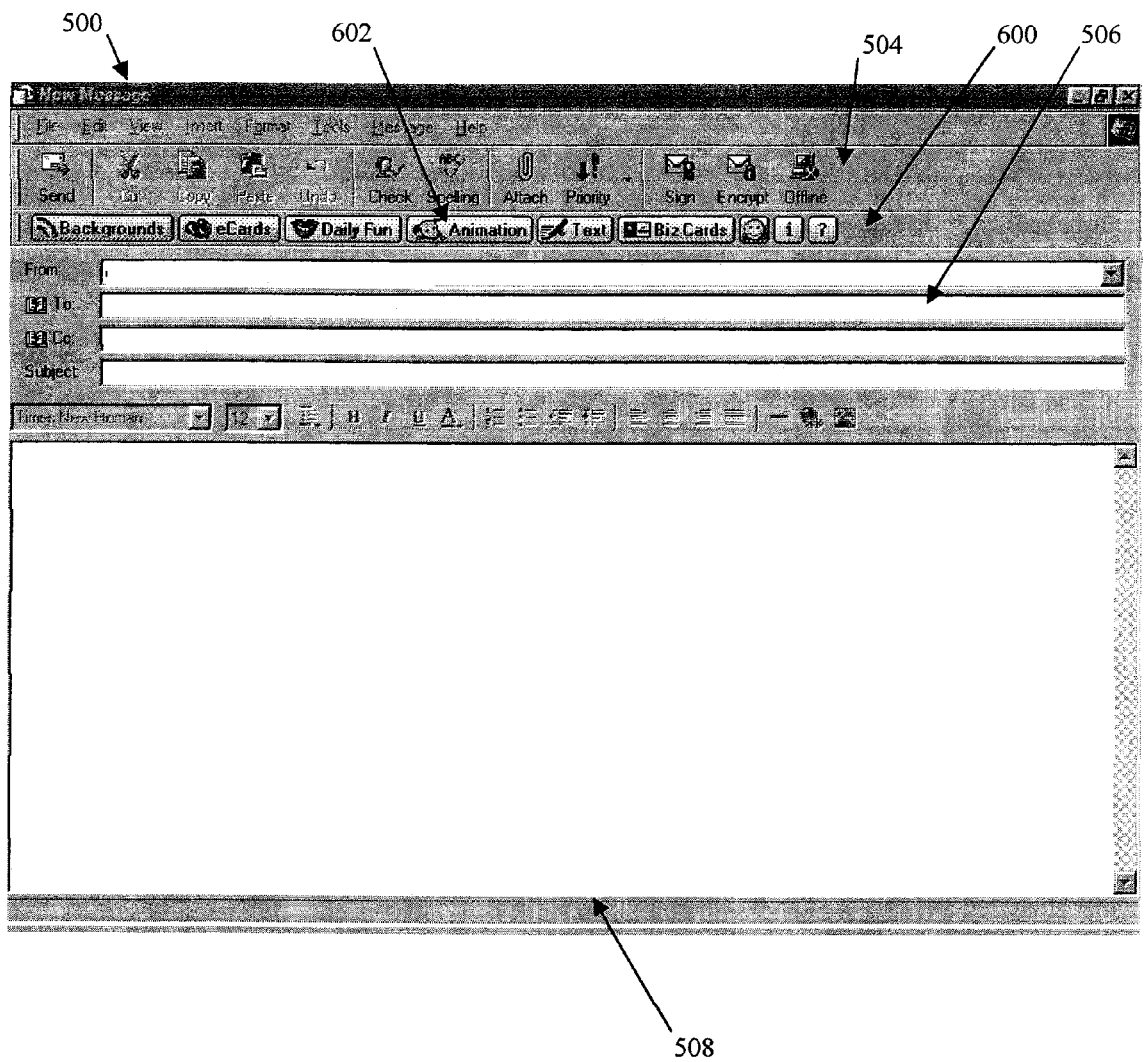
FIG. 22 is an illustration of a message window of an electronic message program including an exemplary virtual toolbar for inserting content into an electronic message, which may be displayed on the user terminal of FIG. 14 after installation of the plug-in according to certain embodiments of the present disclosure.

FIG. 22 is an illustration of a message window of an electronic message program including an exemplary virtual toolbar for inserting content into an electronic message, which may be displayed on the user terminal of FIG. 14 after installation of the plug-in according to certain embodiments of the present disclosure.

Figure 23:
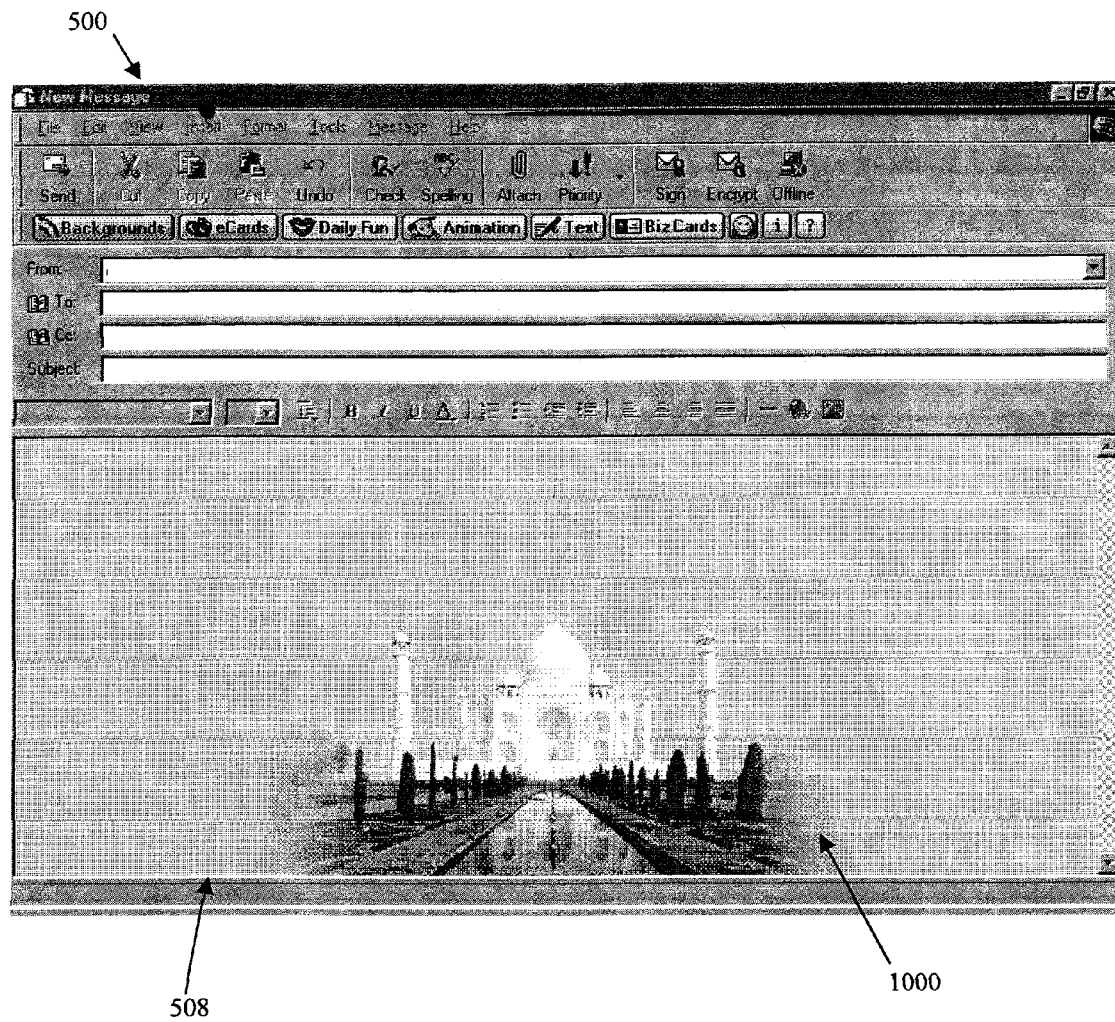
FIG. 23 is an illustration of a message window of an electronic message program including exemplary content selected from the virtual toolbar, according to certain embodiments of the present disclosure.

FIG. 23 is an illustration of a message window of an electronic message program including exemplary content selected from the virtual toolbar, according to certain embodiments of the present disclosure.

Figure 24:
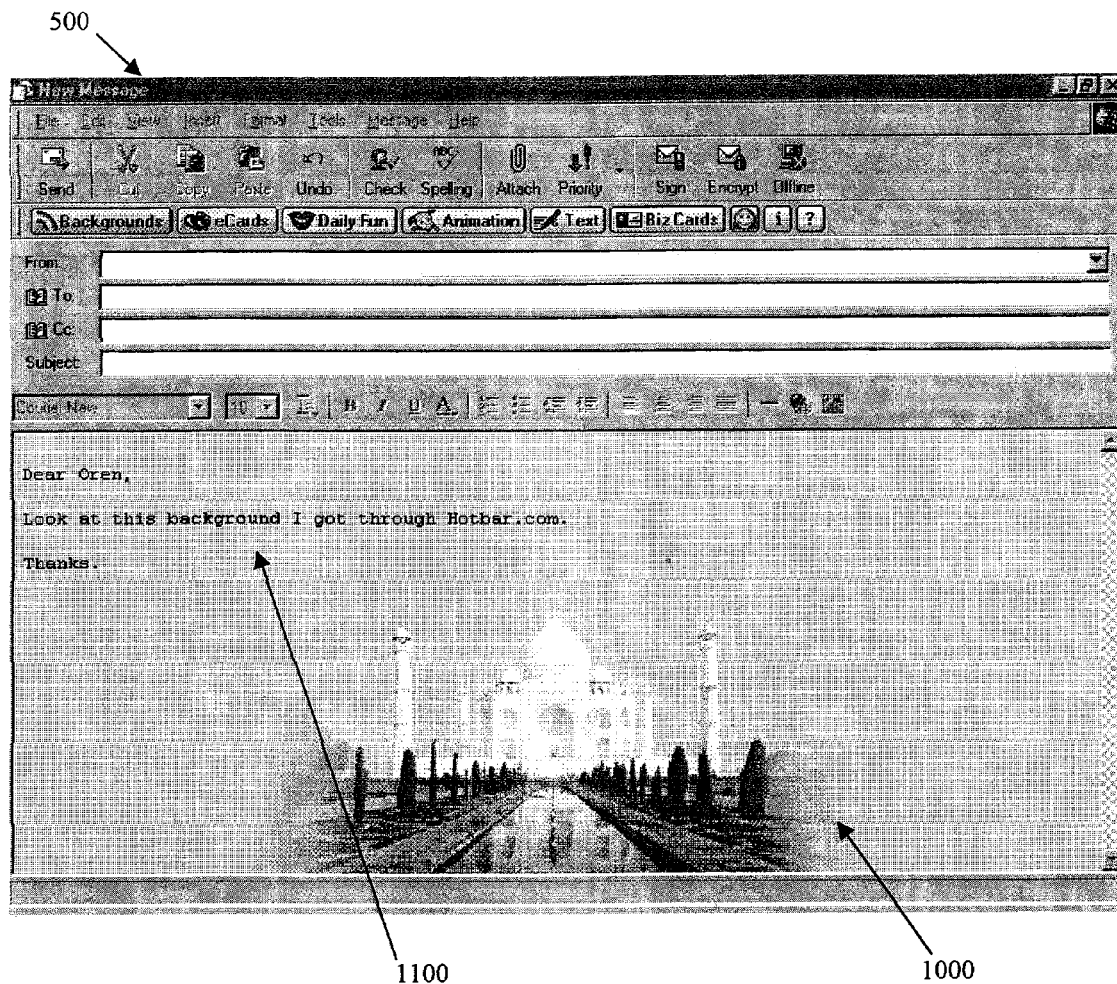
FIG. 24 is an illustration of a message window of an electronic message program including exemplary inputted text over the content selected from the virtual toolbar, according to certain embodiments of an embodiment of the design.

FIG. 24 is an illustration of a message window of an electronic message program including exemplary inputted text over the content selected from the virtual toolbar, according to certain embodiments of an embodiment of the design.

Figure 25:
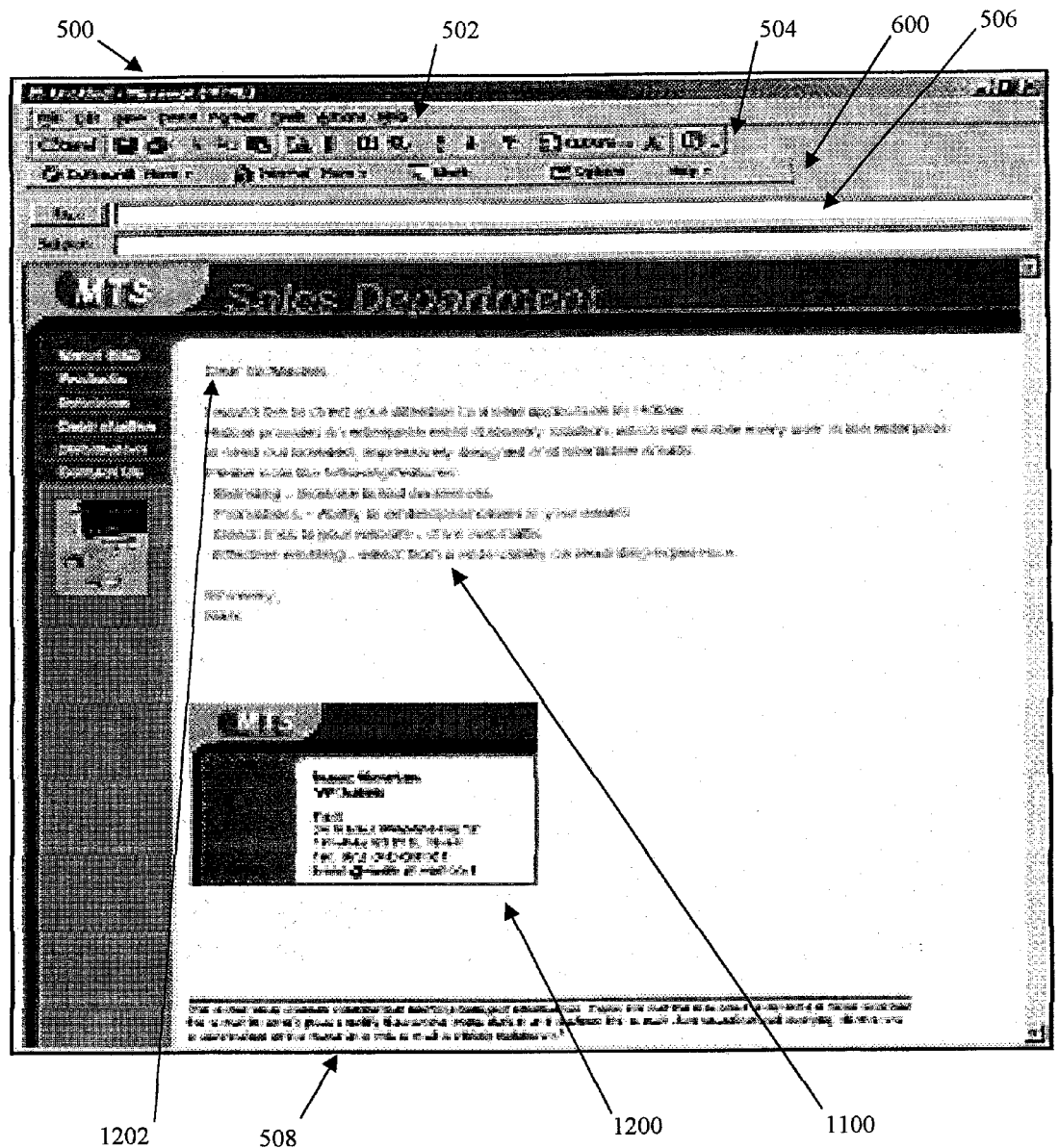
FIG. 25 is an illustration of a message window of an electronic message program including customized business content selected from the virtual toolbar, according to certain embodiments of the present disclosure.

FIG. 25 is an illustration of a message window of an electronic message program including customized business content selected from the virtual toolbar, according to certain embodiments of the present disclosure.

Referring now to FIGS. 14-25, wherein similar components of an embodiment of the design are referenced in like manner, preferred embodiments of a method and system for customizing electronic messages are disclosed.

Turning now to FIG. 14, there is depicted an exemplary network 100 over which certain embodiments of the present disclosure may be practiced. The network 100 may be any known computer, electronic, optical, telecommunications, wireless or satellite network, or any combination of these elements, useful for accomplishing data transmissions between, for example, two users at separate computer terminals. In certain embodiments, the network 100 may be a local-area computer network or wide-area computer network, a corporate Intranet, a public computer network such as the Internet or World-Wide Web, any other comparable computer networks, or any combination of the same.

In those embodiments involving multiple users in electronic communication over a commonly-accessible computer network, the network 100 may include a plurality of user terminals 104 in two-way communication with each other and with a central Plug-In and Content Server 102 (sometimes referred to herein as "content server 102"), via at least one network routing device 106. In such embodiments, the plurality of user terminals 104 may be any one or more known computing devices, such as a personal computer or workstation equipped with a modem or other similar network communication device, as are commonly manufactured by, for example, Dell Corporation™ or Gateway Corporation™. The network routing device 106 may accordingly be any one or more of the following devices: a computer server dedicated to routing communications data over a computer network, such as computer servers commonly manufactured by IBM Corporation™; and a computer network routing device or Internet router, such as those commonly manufactured by Cisco Corporation™. The Plug-in and Content Server 102 may, in such embodiments, be one or more computer servers operated by a content provider or group of content providers. The computer server(s) is/are operable, via appropriate hardware and programming, to store and communicate both: (1) executable programming code or processing instructions for installing an access to content within an existing electronic message program on a user terminal 104 and (2) content to be accessed by the user after installation of the executable programmable code. Further descriptions of an exemplary Plug-In and Content Server 102 are provided later below in conjunction with FIG. 15.

In those embodiments where the network 100 is the Internet, each of the plurality of user terminals 104 and the Plug-In and Content Server 102 may have a unique network address, such as an Internet Protocol (IP) address. A user terminal 104 may be operable to communicate calls for content from an IP address of the Plug-In and Content Server 102. The Plug-In and Content Server 102 may be operable to store the IP address or, store or generate any other type of unique identifier, corresponding to a particular user terminal 104 that has accessed and installed the executable programming code. The Plug-In and Content Server 102 may store such a unique identifier in order to, for example, associate and store any configurations or preferences for content selected by the user, as described later below.

In alternate embodiments where network 100 is not a computer network, each of the Plug-In and Content Server 102, the plurality of user terminals 104 and the network routing device 106 may be substituted with similar devices that perform similar functions in the subject network environment. For example, in a cellular telephone communications network, the plurality of user terminals 104 may be cellular telephones, content server 102 may be a server maintained by a cellular telephone communication provider, and network routing device 106 may be a wireless antenna that routes cellular communications there-between. In another example where network 100 is a satellite network, each of Plug-In and Content Server 102 and the plurality of user terminals 104 may be computers and servers as described previously, and network routing device 106 may be a satellite transmitter/receiver. Likewise, in an optical network environment, the network routing device 106 may be one or more optical communication routers. Additional examples involving alternate network embodiments will be apparent to those of ordinary skill in the art, and are readily contemplated as being within the scope of the present disclosure.

Referring now to FIG. 15, there are depicted exemplary components of a Plug-In and Content Server 102. The content server 102 may include a processor 200, such as those commonly manufactured by Intel Corporation™ or Sun Microsystems Inc.™, for executing machine-readable programming code, commands or processing instructions as described herein. Content server 102 may further include one or more input/output devices 202, which may be any known devices used for communicating over the network 100, such as a modem or similar computer communication device. The input/output devices 102 may also be any known device used for inputting programming commands from an operator of the content server 102, such as a keyboard, a computer mouse, or a speech-recognition device. The input/output devices 102 may further be any known device for displaying data to an operator of content server 102, such as a computer display.

The memory 204 may be any known device (1) for storing content data, such as multimedia content 206, and (2) for storing programming code, commands or processing instructions that are executable by the processor 200, such as plug-in code 208. Accordingly, memory 204 may be any one or more of the following: a random-access memory (RAM); a read-only memory (ROM); a Metal-Oxide Semiconductor (MOS)-based storage device such as a memory chip or a hard drive; a portable computer-readable medium, such as a floppy disk, a Compact Disc-Read Only Memory (CD-ROM), a Digital Video Disc-Read Only Memory (DVD-ROM); or any other known write-once or re-writable computer-readable medium or combination thereof.

Multimedia content 206 stored by memory 204 may include data files that store content, which can be selected and inserted into an electronic message by a user. The content may be any of a variety of multimedia content readily available to current computer users, including: graphical images, scanned images, photographs, pre-formatted text, animations, audio content, audio/visual content and any combination or element thereof. Graphical images may be provided in various data formats, such as, but not limited to: .GIF, .TIF, .BMP, and .JPG Animations may be provided in FLASH programming code or other similar formats. Audio content may be provided in, for example, .WAV or .MP3 formats. Audio/visual content may be of the type commonly available in .MPEG or similarly-functioning formats. The available content may be determined by a content provider maintaining the content server 102, or may alternatively include, separately or in addition thereto, content that is downloaded to the content server 102 by a user or stored locally by a user.

In certain embodiments, the plug-in code 208 stored by memory 204 provides a plug-in to an existing electronic message program on the user terminal 104. Since there are various existing electronic message programs that are already in vast world-wide use, the systems and methods disclosed herein have a greater potential to be widely adopted by users of such existing electronic message programs if a plug-in to such existing programs is provided, rather than attempting to introduce to the global market place a completely new electronic message program incorporating the systems and methods herein. The plug-in is additionally of a smaller size and thus more readily transmitted and installed than would be a completely new electronic message program.

It should be readily appreciated that content server 102 may be a single computer server, or may be any number of locally- or geographically-disperse servers that cooperate to perform the functions described herein. The executable code and data described here as stored by the content server 102 may be stored in any manner among a cooperating group of content servers 102, and may or may not be stored in the same memory 204 as depicted in FIG. 15. It should be further appreciated that the content server 102 may, in certain embodiments, be operated by a content-providing business entity, an agent of such a content provider, or any other operator who maintains the systems and performs the methods described in the present disclosure.

It should likewise be readily appreciated that the user terminals 104 mentioned previously may contain similar hardware components that were described above with respect to the content server 102.

Turning now to FIG. 16, in conjunction with particular references to below, there is depicted an exemplary process 300 for customizing an electronic message according to certain embodiments of the present disclosure. In the context of a computing network 100 as described with respect to FIGS. 14 and 15, the process 300 commences when a user operating a user terminal 104 accesses and downloads the plug-in code 208 from Plug-In and Content Server 102 (step 302). For example, the plug-in code 208 may be retrieved from a publicly accessible IP network address (i.e. a web page on a web site) over the Internet. The download of the plug-in code 208 may be requested by a user or may be automatically transmitted to a user terminal 104 upon its accessing of the content server 102.

Next, the downloaded plug-in code 208 is installed on the user terminal 104 (step 304). It may then be executed by a user, or may be provided with automatically-executing processing instructions, to reconfigure an existing electronic message program on the user terminal 104. In particular, the electronic message program may be reconfigured to display a new virtual toolbar 600 therein.

A comparison of in FIGS. 17 and 18 to FIGS. 19 and 22, respectively, will provide one example of how an electronic message program may be reconfigured by the plug-in code 208 according to step 304. A main window 400 of an existing message program of the prior art is displayed in FIG. 17. Prior to any installation of the plug-in code, the main window 400 may contain: a native menu bar 402 for accessing menus of native programming commands relating to the electronic message program; a native toolbar 404 for selecting native functions of the electronic message program; and a message pane 406 for listing, inter alia, any received electronic messages.

When a user creates a new message using the existing electronic message program, a new electronic message window 500 is generated, an example of which is displayed in FIG. 18. Prior to installation of the plug-in code 208, the electronic message window 500 may contain: a native menu bar 502, a native toolbar 504, a number of message recipient address and message subject fields 506, and a message input field 508.

After installation of the plug-in code 208, the main window 400 and the electronic message window 500 may be reconfigured by the plug-in code 208, as displayed in FIGS. 19 and 20 respectively. As shown in FIG. 19, the main window 400 has been re-configured to include a virtual toolbar 600 containing one or more virtual buttons 602, wherein when a user selects a virtual button 602, a window is presented that shows associated selectable content that is available for insertion into an electronic message.

In certain embodiments, the virtual toolbar 600 may be disposed between the native toolbar 404 and the message pane 406. The insertion of the virtual toolbar 600 at this location in the main window 400 provides a convenient and readily-accessible place for a user to select and access available content. In further embodiments, the toolbar 600 may be provided in alternate useful locations within the main window 400, or even outside the main window 400 on a user terminal's display. Nothing in FIG. 19 should be considered to limit the shape, appearance, configuration or the like of the virtual toolbar 600 or the virtual buttons 602 themselves (including the number or any attributes of the virtual buttons 602), or the particular attributes of the main window 400.

The electronic message window 500 may be similarly reconfigured as described above with respect to FIG. 19. One example of the results of such reconfiguration is shown in FIG. 22, wherein the virtual toolbar 600 is displayed to a user. In certain embodiments, the virtual toolbar 600 may be disposed between the native toolbar 504 and the message input field 508. The virtual toolbar 600 may also be disposed between the native toolbar 504 and the message recipient address and message subject fields 506. The insertion of the virtual toolbar 600 at such locations in the electronic message window 500 provides a convenient and readily-accessible place for a user to select and access available content.

In further embodiments, the virtual toolbar 600 may be provided in alternate useful locations within the electronic message window 500, or outside the electronic message window 500 on a user terminal's display. Nothing in FIG. 22 should be considered to limit the shape, appearance, configuration or the like of the virtual toolbar 600 or the virtual buttons 602 themselves (including the number or any attributes of the virtual buttons 602), or the particular attributes of the electronic message window 500.

The manner in which such reconfigurations of the main window 400 and the electronic message window 500 are achieved is largely dependent on the existing electronic message programs being used by a user terminal 104. For example, where the existing electronic message program is any of the various versions of Microsoft™ Outlook™, such reconfiguration may be accomplished in accordance with the IDTExtensibility2 interface implementation published by Microsoft™. A Common Object Module (COM) object is registered by the plug-in code 208 with the Outlook™ program. The COM object generates a call including a bootstrap parameter that enables recognition by the Outlook™ program for certain plug-in code relating to the attributes and location of the virtual toolbar 600.

Where the existing electronic message program is any of the various versions of Microsoft™ Outlook Express™, such reconfiguration may be accomplished in a slightly different manner, since Outlook Express™ does not readily provide for add-on programming, particularly third-party add-ons by a different manufacturer. In this case, a standard announced by Microsoft™ called hooking may be employed. The standard includes programming "hooks" that allows detection of window events and process crossings initiated by the electronic message program and further allows redirecting native commands to new code. When a new window-creating event for the Outlook Express™ program is detected by the plug-in code 208, a bootstrapping of the new code corresponding to the virtual toolbar 600 and virtual buttons 602 is inserted into the event for providing the virtual toolbar 600 and virtual buttons 602 within the main window 400 and the message window message 500. Such bootstrapping may be accomplished using known sub-classing techniques for planting new code in the electronic message program as described above.

Similar techniques can be employed for other existing electronic mail messaging programs, such as LotusNotes™ by IBM Corporation™. Use of such similar techniques will be largely dependent on the methods of interacting with native programming instructions provided by such programs' manufacturers.

Returning to process 300, after step 304 above, the user may open or initiate the electronic message program, which now includes the virtual toolbar 600, and selects a virtual button 602 from the virtual toolbar 600 that corresponds to particular content, or categories of content, for insertion into an electronic message (step 306). The virtual buttons may include a brief description of a category of content associated with the virtual button 602. Such title on the virtual button may be changed from time to time by the content server 102, and in certain embodiments, without initiation of any commands by the user. Such selection may be performed by a user on user terminal 104 by placing a display cursor over the virtual button 602 and depressing a key on a computer mouse. Upon selection of the virtual button 602, the installed plug-in retrieves a listing of content associated with selected button from content server 102 and displays the available selections to the user (step 308). The displayed listing(s) may be retrieved by the installed plug-in by accessing a web page or the like of the content server 102 over the computer network 100. The web page may contain hypertext links or the like to network address of data files containing the selected content for display to the user in a generated electronic message.

In certain embodiments, the listing may be displayed to the user in a separate content window 700, as shown in FIG. 20. The separate content window 700 may be generated using hyper-text mark-up language (HTML) commands, JAVASCRIPT commands, or the like. The separate content window 700 may include one or more categories (i.e. background art, holiday-themed formats, humor, animations, and business-formatted content) and subcategories (i.e. animal images, nature images, and the like) of available content. Thumbnail images of the content may be displayed in the content window 700. There may also be commands available that allow a user to select particular content as default content for a future electronic message. As mentioned previously, since the content window 700 may contain links to pages of content available on content server 102, and since the data files containing the content may reside exclusively on the content server 102, the content server 102 may update its own pages of content without having to further reconfigure the native programming code of the existing message program or the installed plug-in code. In addition, the amount of stored content is, thus only limited to the available memory space in content server 102, rather than the typically more limited amount of memory space in a user terminal 104. Alternatively, users may store available content locally on their user terminal 104 or may even upload additional content to the content server 102 for later access by the user and/or additional users.

The content window 700 may also include hypertext links to additional content or tabs corresponding to further listings of available content. An example of the results of a selection by a user of one of the hypertext links or tabs in content window 700 is displayed in FIG. 21, wherein further selections of content may be provided.

It should be noted that, with respect to step 308, the virtual button 602 may be selected from the main window 400 or the electronic message window 500. In the former case, the selection of the virtual button 602 from the main window 400 may initiate the opening of a new electronic message window 500 and the content window 700 corresponding to the selected virtual button 602, as shown in FIG. 22.

Returning again to process 300, after the content window 700 is displayed to the user, the user may select desired content for an electronic message from the displayed listing (step 310). The user may also select particular content as default content, if desired from the content window 700. Upon the selection of any type of content, the installed plug-in retrieves the selected content from the corresponding network address on the content server 102, and further inserts the selected content into the electronic message 500 for display to the user (step 312). One example of the results of this step 312 is shown in FIG. 23, wherein selected content 1000 is displayed to the user in the message input field 508 of the electronic message window 500. The user may then input desired text 1100, using a keyboard or the like, into the message input field 508 which may be displayed in conjunction with the selected content 1000, as shown in FIG. 24.

The manner in which retrieval and display of the selected content 1000 is accomplished is dependent upon the type of existing electronic message program in use. Reference is now made to an IHTMLDomDocument (or inspector HTML) interface published by Microsoft™, which is necessary for its electronic message programs to read and edit HTML-based content and is utilized in accordance with various embodiments of the present disclosure.

Where the electronic message program maintained by a user is Outlook™, the plug-in code described herein may retrieve a current active Inspector (or mail window) object in accordance with the above-mentioned published interface. This object has an established function called GetDocument, which provides the necessary inspector HTML Dom Document. Where the electronic message program is Outlook Express™, the installed plug-in code retrieves HTML content by providing appropriate processing instructions via a document container, in accordance with the accessibility software module provided for that program. In either case, the retrieved HTML content may provide both the accessible content and the virtual tool bar 600 of the present disclosure within the user's electronic message program.

Insertion of the selected content 1000 into an electronic message is accomplished using a mail editing module that is commonly provided to Outlook™ and Outlook Express™. The IHTMLDom Document interface enables the installed plug-in code to construct the HTML content within the message input field 508. The user may add desired text 1100 in any standard manner, in accordance with the native processing instructions provided by the electronic message program.

Finally, returning to process 300, the user may transmit the electronic message to a second user on a second user terminal 104 (step 314), after which the process 300 ends. Since some data files of content may be large in size, it may be desirable, in certain embodiments, to limit the size of the message transmitted in step 314. This can be accomplished, in various embodiments, by transmitting an embedded call to the selected content on the content server 102, rather than including the data file of the content itself Upon opening the electronic message, the second user may open the received message, after which the embedded call is activated, and the selected content 1000 is uploaded for display to the selected user, along with any desired text 1100 in the received electronic message. Since the call is embedded in the electronic message by the user on the first user terminal 104, it should be readily appreciated the second user need not install the plug-in code 208 to view the content in the received message. It should also be readily appreciated that once a user installs the plug-in code 208, it is not necessary to re-install the plug-in code 208 for each successive electronic message generated. That is, steps 302 and 304 may be omitted when content is to be inserted in future electronic messages after the plug-in installation has been completed.

In various embodiments of the present disclosure, a content provider operating content server 102 may be able to raise revenue from a group of users using the processes described above. The revenue may be generated via advertising presented to the user during any of the steps of process 300. A plethora of methods for accomplishing the presentation of advertising is well known in the context of public computer networks, all of which are contemplated to be within the scope of the present disclosure. In addition, advertising revenue can be had by providing additional plug-ins to other types of computer programs, such as web browsers, along with the plug-in for the electronic message program described above. Advertising may then be displayed upon use of such other plug-ins by the user. Such additional program plug-ins are described in co-pending U.S. patent application Ser. No. 09/864,551 entitled SYSTEM AND METHOD FOR THE DYNAMIC IMPROVEMENT OF INTERNET BROWSER NAVIGABILITY filed in the name of Dobronsky et al. on May 23, 2001 which is a continuation in part of co-pending U.S. patent application Ser. No. 09/373,815 entitled SYSTEM AND METHOD FOR THE DYNAMIC IMPROVEMENT OF INTERNET BROWSER APPEARANCE AND CONNECTIVITY filed in the name of Dobronsky et al. on Aug. 13, 1999, each of which are incorporated herein by reference. In addition to, or in conjunction with advertising, a content provider may also generate revenue by charging subscription fees to users wishing to access the content.

Revenue may also be generated by providing design services to users for generating customized content that is accessible to a particular user or group of users paying for such services. For example, one contemplated feature of the present disclosure is providing business-formatted content for insertion into an electronic message. General business-formatted content can be provided to all users. However, customized business message formats and associated designs may be developed by the content provider specifically for a single business entity, in exchange for a fee. Installation and updating of customized message formats may be accomplished in a similar manner to those described above, or in any other useful manner. The developed content may include corporate logos, trademarks, company information, general corporate contact information, stationary designs, business card designs for particular employees and agents of the business entity, promotional materials, advertising and particular formats for internal and external electronic messages, including pre-formatted locations for desired text 1100 inputted by the business entity or its agents. An example of customized business-formatted content is shown in FIG. 25, including custom developed content 1200, pre-formatted text 1202 and pre-formatted location for inserting desired text 1100.

In other additional embodiments of the present disclosure, the installed plug-in code may further include processing instructions allowing for the attributes of the virtual toolbar 600 and virtual buttons 602 to be changed by accessing new formats and attributes automatically from the content server 102 whenever a user's reconfigured electronic message program is initiated. In this manner, it is not necessary for a user to perform any steps to receive updates to the installed plug-in code. In a particular embodiment, no user action is required in order for them to receive updates to either accessible content or the virtual menu bar including the virtual buttons. For example, where a virtual button is identified as having content associated with an upcoming holiday, once that holiday passes and a new holiday is approaching, the content server 102 may automatically access and change the name of the button when the electronic message program is open. The web page of associated content maintained by the content server may likewise be updated to include different content dedicated to the upcoming holiday without user interaction.

Nothing described herein or shown in the figures should be construed to limit the scope and attributes of content available for insertion into electronic messages via the processes described herein. Although the design has been described in detail in the foregoing embodiments, it is to be understood that the descriptions have been provided for purposes of illustration only and that other variations both in form and detail can be made thereupon by those skilled in the art without departing from the spirit and scope of the design, which is defined solely by the appended claims.

A computer-readable medium may be encoded with processing instructions to implement a method, performed by a computer, for allowing customization of electronic mail messages. The method may provide executable programming code for including a virtual toolbar in a desktop electronic mail message program of a user terminal. The executable programming code displays the virtual toolbar within a window of the electronic mail message program, separate from a native toolbar. The code may receive, from a user, a selection of a virtual button of the virtual toolbar. The selected virtual button associated with selectable content includes graphics for inclusion in an electronic mail message generated by the user from the electronic mail message program, at least a portion of the content being downloadable from a remote server responsive to the selection of the at least one virtual button, and the at least one virtual button being associated with a category of available content including a plurality of selectable sub-categories thereof.

A computer-readable medium may be encoded with processing instructions for implementing a method, performed by a computer, for customizing electronic mail messages. The method may provide a plug-in to a desktop electronic mail message program. Executing programming instructions from the plug-in will generate a virtual toolbar, independent of a native toolbar of the electronic mail message program, for display within the electronic mail message program. The virtual toolbar includes at least one virtual button for selecting content including graphics for inclusion in an electronic mail message, at least a portion of the content being downloadable from a remote server responsive to a selection of the at least one virtual button, and the at least one virtual button being associated with a category of available content including a plurality of selectable sub-categories thereof.

In one embodiment, the software used to facilitate the algorithms discussed herein can be embodied onto a non-transitory machine-readable medium. A machine-readable medium includes any mechanism that stores information in a form readable by a machine (e.g., a computer). For example, a machine-readable medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

While embodiments of the design have been described by way of illustration, it will be understood that the design can be carried out by persons of ordinary skill in the art with many modifications, variations and adaptations, without departing from the scope of the claims and the legally permissible equivalents thereof. The invention is to be understood as not limited by the specific embodiments described herein, but only by scope of the appended claims.

What is claimed is:

1. A method in a client-server environment for presenting graphic and other information on an area of a webpage accessible by a browser application resident on a client device, comprising:
providing a plug-in for installation in the browser application, where the plug-in is one of 1) installed or 2) caused to be installed in the browser of a web surfer, and the plug-in is configured to allow information to be dynamically 1) added to, 2) modified in, and 3) any combination of the two, the area of the browser containing a user-selectable button by the action of the plug-in;
displaying the user-selectable button in the area of the webpage;
wherein the user-selectable button includes at least one of graphic information and a text label, where the user-selectable button is configured to any of 1) direct the web browser to at least one web site corresponding to the text label, 2) direct the web browser to content related links to a content that is on the website being browsed, and 3) any combination of both, where a third party server site is configured dynamically controls what graphic information, text label, or both is being displayed for that user-selectable button, where the third party server site is configured to dynamically control where the user selectable button directs the web browser when the graphic information or text is modified and is directed to at a first period of time to a first website, and at a second period of time the user selectable button directs the web browser to a second website, where the content in a first set of graphic information, text label, or both that is being displayed within the area of that user-selectable button at the first time is different than the content in a second set of graphic information, text label, or both that is being displayed within the area of that user-selectable button at the second time.

2. The method of claim 1, where the user-selectable button is related to a specific product displayed within the web page being browsed, and is configured when the user-selectable button is clicked, then a display occurs of comparative shopping information related to such specific product.

3. The method of claim 1, where the graphic information or the text label is dynamically changed based on information associated with 1) the user, 2) when the browser navigates from one website to another website, and 3) any combination of the two, where a first graphic information, text label and any combination of both, is displayed for the user-selectable button when a first web site is being accessed and a second graphic information, text label and any combination of both, is displayed for the user-selectable button when a second web site is being accessed and the first graphic information, text label and any combination of both is different than the second graphic information, text label and any combination of both.

4. The method of claim 1, wherein the dynamic controls of the graphic information and the text label occurs by updating an appearance of the button based on the web site being accessed by the web browser.

5. The method of claim 1, further including:
executing programming instructions from the plug-in to generate a virtual toolbar for the web browser, independent of a native toolbar of the web browser program, for display within the web browser program on a display screen of the client computing device, where the virtual toolbar includes at least one virtual button, including the user-selectable button, for selecting additional content or services available by a service website, and at least a portion of the content or services being downloadable from a remote server responsive to a selection of the at least one virtual button, and the at least one virtual button being associated with a category of available content, where a plurality of selectable categories can be selected from.

6. A computer-implemented method for presenting graphic and other information in a toolbar area of a browser, the method comprising:
displaying at least one user-selectable button in the toolbar area of the browser,
wherein the user-selectable button includes graphic information, a text label, or both;
receiving user input selecting the user-selectable button;
directing the browser to at least one web site related to the graphic information or the text label of the user-selectable button; and
changing the graphic information or the text label dynamically based on information associated with 1) related links to a content on the website that is being browsed by a user of a client device running the browser, 2) user's browsing activity of navigating from one website to another website, and 3) any combination of the two, and where the changed graphic information or changed text label are provided to the browser of the web surfer by a service web site, where the service web site is configured to dynamically control what graphic information, text label, or both is being displayed for that user-selectable button, where the service web site is configured to dynamically control where the user selectable button directs the web browser when the graphic information or text is modified and is directed to at a first period of time to a first website, and at a second period of time the user selectable button directs the web browser to a second website, where the content in a first set of graphic information, text label, or both that is being displayed within the area of that user-selectable button at the first time is different than the content in a second set of graphic information, text label, or both that is being displayed within the area of that user-selectable button at the second time.

7. The method of claim 6, wherein the graphic information includes an image, and where the browser has its standard toolbar and is modified in appearance and function through an addition of the user-selectable button and where the service web site is a system that includes one or more web sites other than a service site where the plug-in is downloaded from, and the other web sites are equipped and configured to provide the changing graphic information, text label, or both dynamically to the browser of the web surfer.

8. The method of claim 6, wherein the graphic information includes an icon, and the changing of the graphic information or the text label is dynamically changed based on the information associated with the content on the website that is being browsed by the user.

9. The method of claim 6, wherein the changing of the graphic information or the text label is dynamically changed based on the information associated with the user's browsing activity, and wherein the user-selectable button is configured to when clicked on or depressed to cause a pop-up menu of selected website links to appear.

10. The method of claim 6, wherein the changing of the graphic information or the text label is dynamically changed based on the information associated with the content on the website that is being browsed by the user, and where the browser is a program running on the computing device that permits the computing device to connect to the Internet through 1) a modem or 2) a Wi-Fi network.

11. The method of claim 6, further comprising:
changing at least one web site to which the user-selectable button directs the user when the graphic information or text label is updated.

12. The method of claim 6, further comprising:
displaying, upon selection of the user-selectable button by the user, a list that includes links to each of the related web sites to which the user-selectable button directs the browser.

13. A system that includes a service website and an executable program component installed or plugged in on a client device, comprising:
the service website has a processor configured to perform the step of executing machine-readable programming code, commands, and processing instructions, where the service website further includes one or more input/output devices used for communicating instructions and commands over a network to the client device through a network routing device, and one or more modules to cooperate with the executable program component installed or plugged in on the client device;
where the service website is configured to perform the step of employing the processor, the input/output devices, and the network routing device to cooperate with the client device having a resident browser,
where the service website is configured to perform the step of employing the processor, the input/output devices, and the network routing device to cooperate with the client device to provide graphic information, a text label, or both in the browser, where the service website is connected to the network;
where the service website is configured to perform the step of employing the processor, the input/output devices, and the network routing device to cooperate with the client device to modify the graphic information or text label based on information associated with 1) related links to a content on the website that is being browsed by a user of the client device running the browser, 2) a user's browsing activity of navigating from one website to another website, and any combination of the two;

where the service website is configured to perform the step of employing the input/output devices and the network routing device to cooperate with the client device to engage in a two way communication through the network routing device with the executable program component installed or plugged in on the client device, where a user selectable button is provided by the executable program component and the client device is configured to display the user-selectable button in association with the graphic information or text label, wherein the user-selectable button is configured for directing the browser to at least one website related to the graphic information or text label, and wherein the user-selectable button is provided via the executable program component installed or plugged in to cooperate with the browser; and where the service web site is configured to perform the step of employing the processor, the input/output devices, and the network routing device to cooperate with the client device to dynamically control what graphic information, text label, or both is being displayed for that user-selectable button, where the service web site dynamically controls where the user selectable button directs the web browser when the graphic information or text is modified and is directed to at a first period of time to a first website, and at a second period of time the user selectable button directs the web browser to a second website, where the content in a first set of graphic information, text label, or both that is being displayed within the area of that user-selectable button at the first time is different than the content in a second set of graphic information, text label, or both that is being displayed within the area of that user-selectable button at the second time, where the service website contains hardware including the processor and the one or more input/output devices, where the client device and the service website may each contain one or more non-transitory storage mediums, and where when one or more portions of the service website are implemented in software, then that software is tangibly stored in an executable format on the one or more non-transitory storage mediums and the software is coded to be executed by the processor, and where the executable program component is tangibly stored in an executable format on the one or more non-transitory storage mediums and is coded to be executed by another processor located on the client device.

14. The service website of claim 13, wherein the graphic information includes an image, and where a mechanism is provided in the service web site that is configured to supply the plug-in to the browser of a web surfer as requested by the browser, and where the mechanism dynamically permits the user of the browser to dynamically download the changed graphic information and text label to be added to the toolbar area of the browser by the action of the plug-in.

15. The service website of claim 13, wherein the graphic information includes an icon, where the client computer is configured to send information which information may include its current location URL to the service website, and then receiving from the service website a list of the appropriate user-selectable buttons to be displayed on the toolbar.

16. The service website of claim 13 wherein the changing of the graphic information or the text label is dynamically changed based on the information associated with the related links to the content on the website that is being browsed by the user of a client device running the browser.

17. The service website of claim 13 wherein the changing of the graphic information or the text label is dynamically changed based on the information associated with the user.

18. The service website of claim 13, further comprises:
changing at least one web site to which the user-selectable button directs the user when the graphic information or text label is modified; and
displaying, upon selection of the user-selectable button by the user, a list that includes links to each of the related web sites to which the user-selectable button directs the browser.

19. A method in a client computing device and server environment to provide graphic and other information to a browser's toolbar area of a web surfer, comprising:
providing a plug-in;
transmitting the plug-in, which is configured to install in the browser of the web surfer, the graphic and other information displayed as a skin in the toolbar area of the browser by the operation of a module of the plug in, where the graphic and other information is configured to be displayed on a display screen of the client computing device;
where the plug-in is configured to cooperate with the server to allow the graphic and other information to be dynamically modified according to selections made by the web surfer through the use of a service website; and
updating the graphic and other information displayed as a skin in the toolbar area of the browser on the display of the computing device based on the selections made by the web surfer, where the service website is configured to dynamically control what graphic information or other information is being displayed for that user-selectable button, where the service website is configured to dynamically control where the user selectable button directs the web browser when the graphic information or other information is modified and is directed to at a first period of time to a first website, and at a second period of time the user selectable button directs the web browser to a second website, where the content in a first set of graphic information or other information that is being displayed within the area of that user-selectable button at the first time is different than the content in a second set of graphic information or other information that is being displayed within the area of that area of that user-selectable button at the second time.

20. The method according to claim 19, wherein the graphic and other information displayed as a skin in the toolbar area comprises a button, a link, or either of these two that is configured to launch an application, game or other service that can be executed directly from the browser toolbar area, when the button or link is activated.

21. The method according to claim 19, wherein the graphic and other information that is dynamically modified comprises an addition to the toolbar area of a button, a link, or either of these two that is configured to launch an application, game or other service that can be executed directly from the browser toolbar area, when the button or link is activated.

\* \* \* \* \*

UNITED STATES PATENT AND TRADEMARK OFFICE
CERTIFICATE OF CORRECTION

| | | Page 1 of 1 |
|---|---|---|
| PATENT NO. | : 8,959,330 B2 | |
| APPLICATION NO. | : 13/615002 | |
| DATED | : February 17, 2015 | |
| INVENTOR(S) | : Oren Dobronsky | |

It is certified that error appears in the above-identified patent and that said Letters Patent is hereby corrected as shown below:

Title page,

After Line (22), please add:

(30)    Foreign Application Priority Data

Jul. 15, 1999 (IL) ..................................................................................................130972

In the Claims

In Column 22, line 37, claim 1, line 10, please delete: "browser" and add: webpage;
In Column 22, line 39, claim 1, line 12, please delete: "the area" and add: a toolbar area;
In Column 22, line 48, claim 1, line 21, please delete: "dynamically controls" and add: to dynamically control.
In Column 23, line 58, claim 6, line 26, please delete: "at".
In Column 26, line 48, claim 19, line 33, please delete the first recitation of: "area of that".

Signed and Sealed this
Eighteenth Day of August, 2015

Michelle K. Lee
*Director of the United States Patent and Trademark Office*